(12) United States Patent
Ishino et al.

(10) Patent No.: US 8,963,395 B2
(45) Date of Patent: Feb. 24, 2015

(54) MOTOR CORE, STATOR, AND METHOD FOR MANUFACTURING STATOR

(75) Inventors: Yukihide Ishino, Kosai (JP); Akitomo Sasaki, Kosai (JP); Akihiro Utsumi, Kosai (JP); Toshiaki Yamada, Hamamatsu (JP)

(73) Assignee: Asmo Co., Ltd., Kosai-shi (JP)

( * ) Notice: Subject to any disclaimer, the term of this patent is extended or adjusted under 35 U.S.C. 154(b) by 389 days.

(21) Appl. No.: 13/477,881

(22) Filed: May 22, 2012

(65) Prior Publication Data

US 2012/0299432 A1 Nov. 29, 2012

(30) Foreign Application Priority Data

May 26, 2011 (JP) ................................. 2011-118331

(51) Int. Cl.
*H02K 1/18* (2006.01)
*H02K 1/14* (2006.01)
*H02K 15/02* (2006.01)
*H02K 3/52* (2006.01)

(52) U.S. Cl.
CPC ............... *H02K 3/522* (2013.01); *H02K 1/148* (2013.01); *H02K 2203/09* (2013.01)
USPC ..................... 310/216.008; 29/596

(58) Field of Classification Search
USPC ....................... 310/216.008–216.009; 29/596
See application file for complete search history.

(56) References Cited

U.S. PATENT DOCUMENTS 6,844,653 B2 * 1/2005 Kolomeitsev et al. . 310/216.082
2009/0134742 A1 * 5/2009 Rhode ............................ 310/218

FOREIGN PATENT DOCUMENTS

| JP | 3430839 | 5/2003 |
| JP | 4444639 | 1/2010 |

* cited by examiner

*Primary Examiner* — Burton Mullins
(74) *Attorney, Agent, or Firm* — Christensen Fonder PA

(57) ABSTRACT

An annular motor core has a plurality of split core pieces, each of which includes a yoke portion and a tooth. The split core pieces are circumferentially located and arranged in an annular shape such that the yoke portions of the core pieces form an annular shape as a whole and that the distal ends of the teeth of the core pieces face inward or outward each in a radial direction of the core. The core further includes an annular holder, which has joint portions at a plurality of positions in a circumferential direction of the holder. A first end of each of the core pieces is pivotably joined to the corresponding one of the joint portions. Each core piece can be pivoted about the corresponding joint portion relative to the holder such that a second end of the core piece moves in a radial direction of the holder.

15 Claims, 15 Drawing Sheets

Cross Section A-A

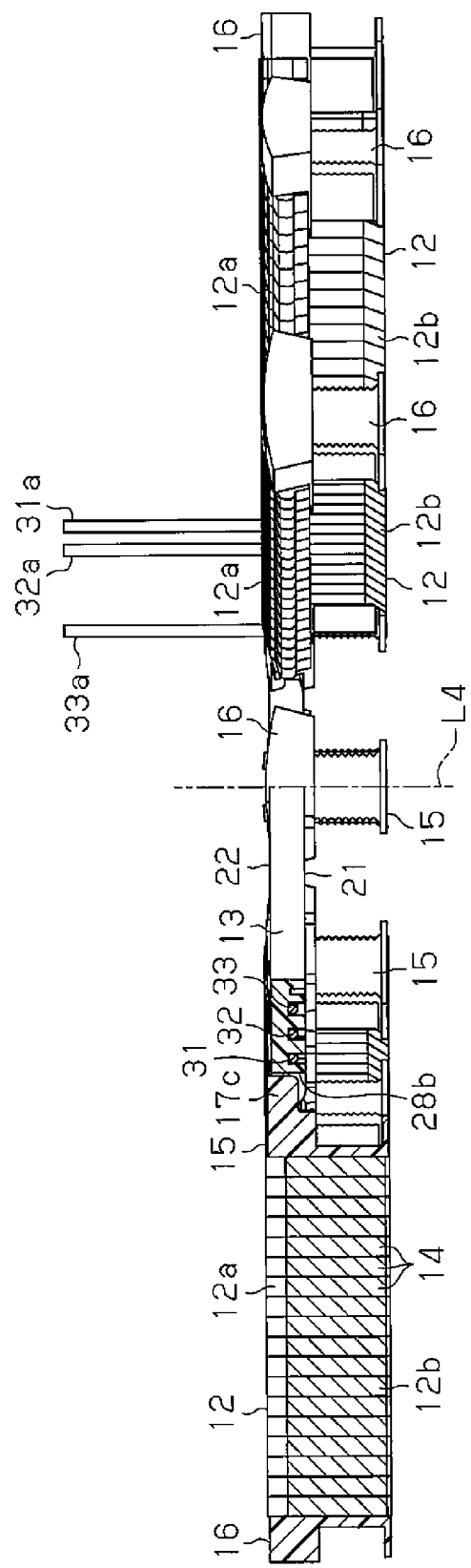

MOTOR CORE, STATOR, AND METHOD FOR MANUFACTURING STATOR

BACKGROUND OF THE INVENTION

The present invention relates to a motor core formed by a plurality of split core pieces arranged in an annular shape, a stator having the motor core, and a method for manufacturing the stator.

Conventionally, a stator mounted in a brushless motor or the like includes an annular motor core, which has a plurality of radial teeth. A coil is wound around each of the teeth. The ends of each corresponding pair of the coils are electrically connected to each other through a bus bar, which is mounted in the stator.

As described in Japanese Patent No. 4444639, an annular motor core for a stator is configured by a plurality of split core pieces, each of which includes a yoke portion extending in a circumferential direction of the motor core and a tooth extending substantially perpendicular to the yoke portion. The split core pieces are circumferentially located and arranged in an annular shape. Each of the split core pieces is formed by stacking two types of core sheets alternately in the axial direction. Each of the core sheets includes a yoke forming portion, which is laminated with another yoke forming portion to form the yoke portion, which extends in the circumferential direction of the motor core. Each of the yoke forming portions has opposite circumferential ends, one of which is referred to as a first end located at a first circumferential side, with the other referred to as a second end located at a second circumferential side. The two types of core sheets include a first type of core sheets and a second type of core sheets. Specifically, each of the first type of core sheets includes an arcuate projection, which projects from the first end and has an arcuate shape as viewed in the axial direction, and an arcuate recess, which is formed in the second end and also has an arcuate shape as viewed in the axial direction. Each of the second type of core sheets has an arcuate recess, which is formed in the first end and is shaped arcuate as viewed in the axial direction, and an arcuate projection, which projects from the second end and has an arcuate shape as viewed in the axial direction. Each split core piece is formed by laminating the two types of core sheets alternately in the axial direction. The corresponding circumferential ends of the yoke portions of each adjacent pair of the split core pieces are pivotably engaged with each other such that the arcuate projections of the split core pieces are overlapped alternately as viewed in the axial direction. An insulator is attached to each split core piece to ensure insulation between a coil wound around the tooth and the split core piece. Each adjacent pair of the split core pieces are pivotably joined together through the insulators. The split core pieces, which are joined together through the associated insulators, are arranged such that the interval between the distal ends of each adjacent pair of the teeth increases. In this state, a coil is wound around each of the teeth over the corresponding one of the insulators. Then, by pivoting each adjacent pair of the split core pieces, the split core pieces are arranged in an annular shape such that the yoke portions form an annular shape as a whole and that the distal ends of the teeth all face radially inward with respect to the annular shape. When the split core pieces are arranged in the annular shape, the coils are arranged in a circumferential direction.

As described in Japanese Patent No. 3430839, corresponding ends of multiple coils of a stator are electrically connected together through a plurality of bus bars. Each of the bus bars is formed by a linear coated conductive wire, the outer periphery of which is coated by an insulating membrane, and has an arcuate shape. Each bus bar is held by a circular holder. A connection wire, which extends radially to project radially outward from the holder, is formed at each of the opposite ends of each bus bar. The holder is arranged at the side corresponding to an axial end of a motor core, in which the coils are mounted, thus arranging the bus bars at the side corresponding to the corresponding axial ends of the coils. Each of the connection wires and the end of the associated one of the coils are arranged parallel to each other at a position radially outward relative to the holder. In this state, a connection terminal is mounted on the connection wire and the end of the coil, which are parallel to each other, to cover the outer periphery of the connection wire and the outer periphery of the end of the coil. The connection terminal, the connection wire, and the end of the coil are swaged to electrically connect the connection wire to the end of the coil. As has been described, the bus bars described in Japanese Patent No. 3430839 are formed by the linear coated conductive wires. This reduces waste of the material and increases the yield.

However, in the motor core described in Japanese Patent No. 4444639, the corresponding circumferential ends of the yoke portions of each adjacent pair of the split core pieces are engaged with each other such that the arcuate projections of the split core pieces are alternately overlapped as viewed in the axial direction. As a result, when the adjacent split core pieces are pivoted relative to each other, the arcuate projections of the split core pieces slide over each other. This causes the mutually engaged yoke portions to slide on each other, thus producing friction, which hampers pivot of the split core pieces. The split core pieces are arranged in an annular shape, or, in other words, subjected to annular arrangement, in the state in which the interval between the distal ends of each adjacent pair of the teeth is increased (for example, the state in which the split core pieces are aligned linearly such that the teeth extend parallel to one another). In other words, the annular arrangement of the split core pieces is performed in a state greatly different from the state in which the split core pieces are circumferentially arranged to form an annular motor core. This complicates the annular arrangement of the split core pieces, thus making it difficult to carry out a step for arranging the split core pieces in an annular shape.

SUMMARY OF THE INVENTION

Accordingly, it is an objective of the present invention to provide a motor core that facilitates annular arrangement of a plurality of split core pieces, a stator having the motor core, and a method for manufacturing the stator.

To achieve the foregoing objective and in accordance with one aspect of the present invention, an annular motor core having a plurality of split core pieces is provided. Each of the split core pieces includes a yoke portion extending in a circumferential direction of the motor core and a tooth extending from the yoke portion substantially in a direction perpendicular to the yoke portion. The split core pieces are circumferentially located and arranged in an annular shape such that the yoke portions of the split core pieces form an annular shape as a whole and that the distal ends of the teeth of the split core pieces face inward or outward in a radial direction of the motor core. Each of the split core pieces has a first end and a second end in the axial direction of the motor core. The motor core further includes an annular holder. The holder has joint portions at a plurality of positions in a circumferential direction of the holder. The first end of each split core piece is pivotably joined to a corresponding one of the joint portions. Each split core piece is pivotable about the corresponding joint portion relative to the holder such that the second end of the split core piece moves in a radial direction of the holder.

In accordance with another aspect of the present invention, a stator is provided that includes the above described motor core, and a plurality of coils each wound around the tooth of a corresponding one of the split core pieces. The stator further includes a plurality of bus bars each extending in a circumferential direction of the holder. The bus bars are layered in a radial direction of the holder and held by the holder. The holder has a guide portion for guiding an end of each of the coils such that the ends of the coils intersect the bus bars as viewed in the axial direction. The end of each coil is electrically connected to the corresponding one of the bus bars in a connection intersecting portion where the end intersects the bus bar.

In accordance with another aspect of the present invention, a method for manufacturing the above described stator is provided. The method includes: a winding step for winding the coils around the teeth of the corresponding split core pieces; a joining step following the winding step, wherein, in the joining step, the first ends of the split core pieces are pivotably joined to the corresponding joint portions of the holder; and an annular arrangement step following the joining step, wherein, in the annular arrangement step, the split core pieces are pivoted about the associated joint portions relative to the holder such that the second end of each of the split core pieces moves in a radial direction of the holder to arrange the split core pieces in an annular shape such that the yoke portions of the split core pieces form an annular shape as a whole and that the distal end of the tooth of each split core piece faces inward or outward in a radial direction of the holder.

In accordance with another aspect of the present invention, a method for manufacturing the above described stator is provided. The method includes: a joining step for pivotably joining the first ends of the split core pieces to the corresponding joint portions of the holder; a winding step following the joining step, wherein, in the winding step, the split core pieces are arranged such that the axial direction of each split core piece corresponds to a radial direction of the holder and, in this state, the coils are wound around the teeth of the corresponding split core pieces; and an annular arrangement step following the winding step, wherein, in the annular arrangement step, the split core pieces are pivoted about the corresponding joint portions relative to the holder such that the second end of each of the split core pieces moves in a radial direction of the holder to arrange the split core pieces in an annular shape such that the yoke portions of the split core pieces form an annular shape as a whole and that the distal end of the tooth of each split core piece faces inward or outward in a radial direction of the holder.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 19 is a half cross-sectional view of the stator taken along line B-B of FIG. 18, illustrating the method for manufacturing the stator illustrated in FIG. 17.

DETAILED DESCRIPTION OF THE PREFERRED EMBODIMENTS

One embodiment of the present invention will now be described with reference to the attached drawings.

Figure 1:
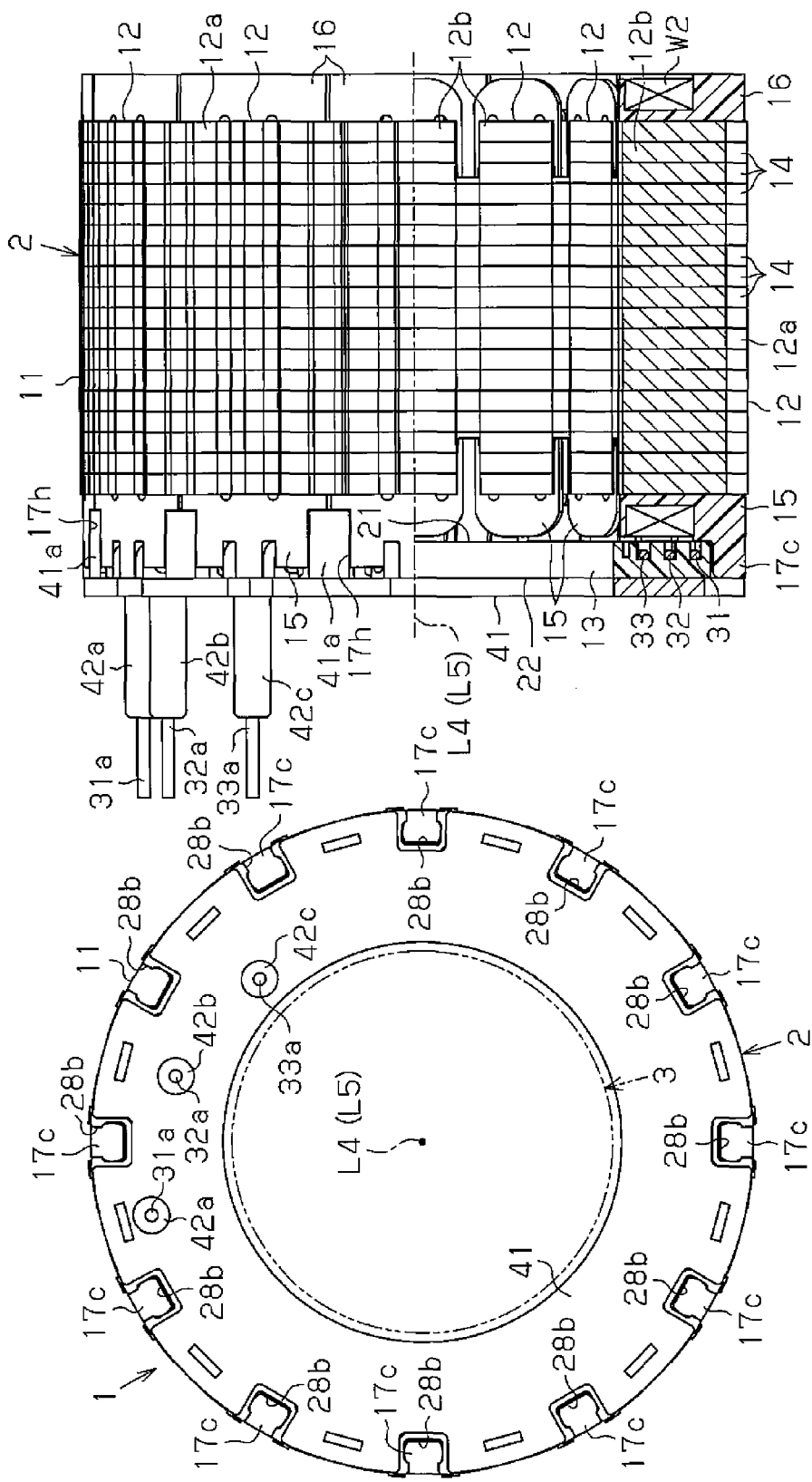
FIG. 1A is an axial view schematically showing a brushless motor.
FIG. 1B is a half cross-sectional view showing a stator illustrated in FIG. 1A as viewed from beside.
Figure 2:
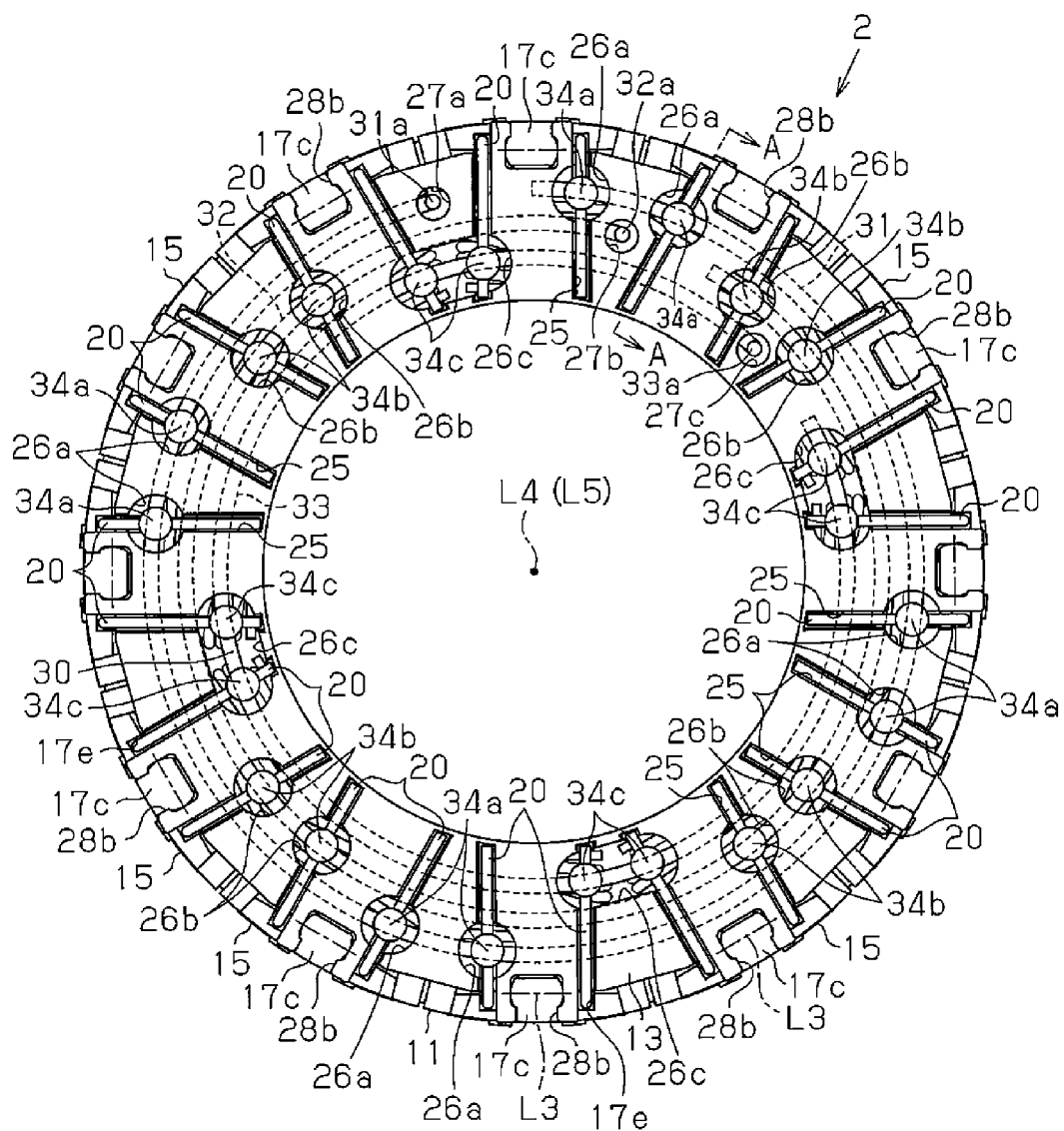
FIG. 2 is a front view showing the stator illustrated in FIG. 1A without a cover.
Figure 3A:
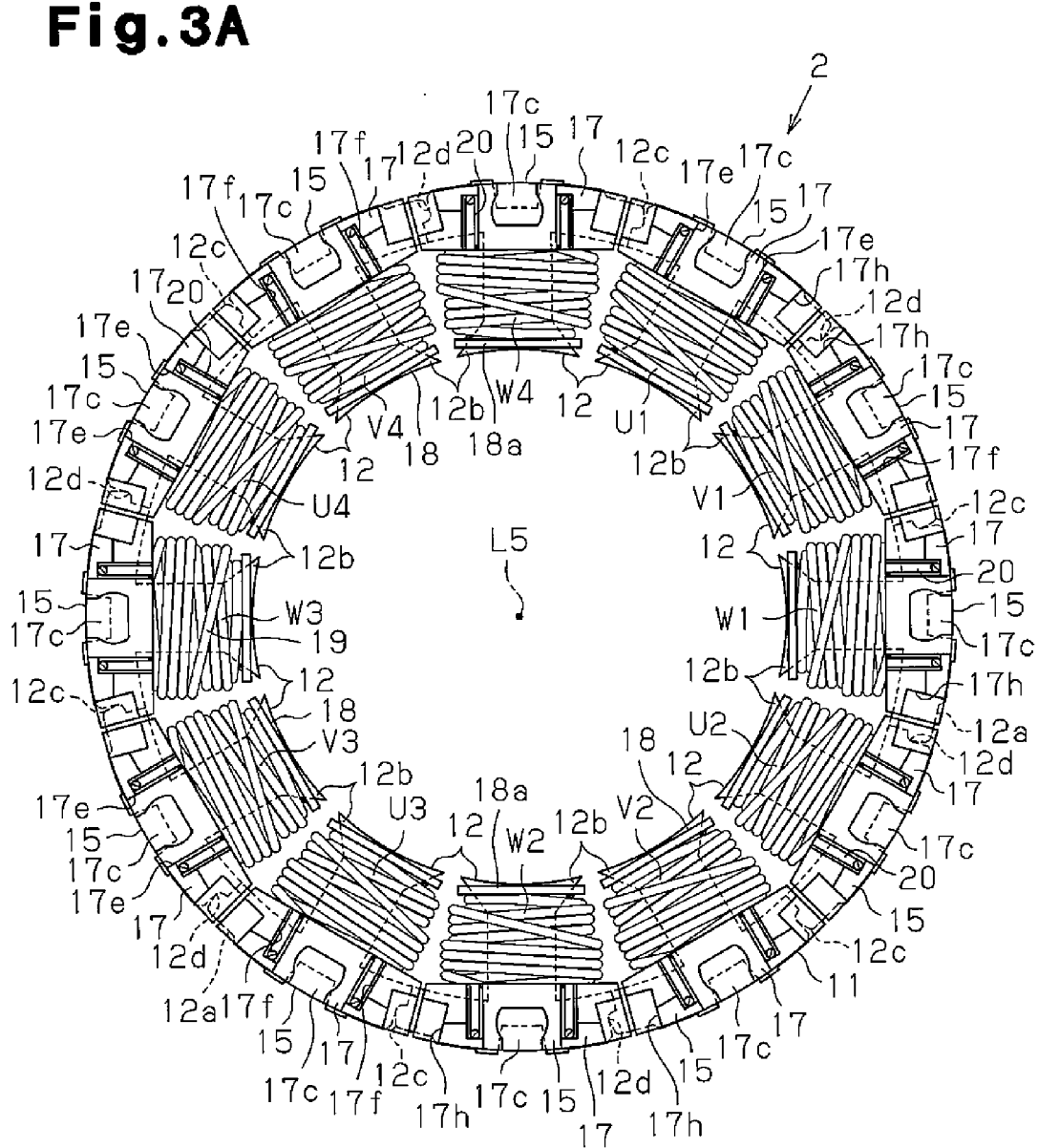
FIG. 3A is a front view showing the stator illustrated in FIG. 2 without a holder.

As shown in FIG. 1A, a brushless motor 1 of the illustrated embodiment has a circular stator 2 and a rotor 3, which is arranged inside the stator 2 in a circumferentially rotatable manner. In other words, the brushless motor 1 of the embodiment is an inner rotor type motor. With reference to FIGS. 1, 2, and 3A, the stator 2 includes a substantially circular stator core 11, a plurality of (in the embodiment, twelve) coils U1, U2, U3, U4, V1, V2, V3, V4, W1, W2, W3, W4, which are mounted in the stator core 11, bus bars 31, 32, 33 for supplying electric power to the coils U1 to U4, V1 to V4, and W1 to W4, and a cover 41.

The stator core 11 includes a plurality of (in the illustrated embodiment, twelve) split core pieces 12, which are circumferentially arranged, and a circular holder 12 to which the split core pieces 12 are joined.

Figure 4:
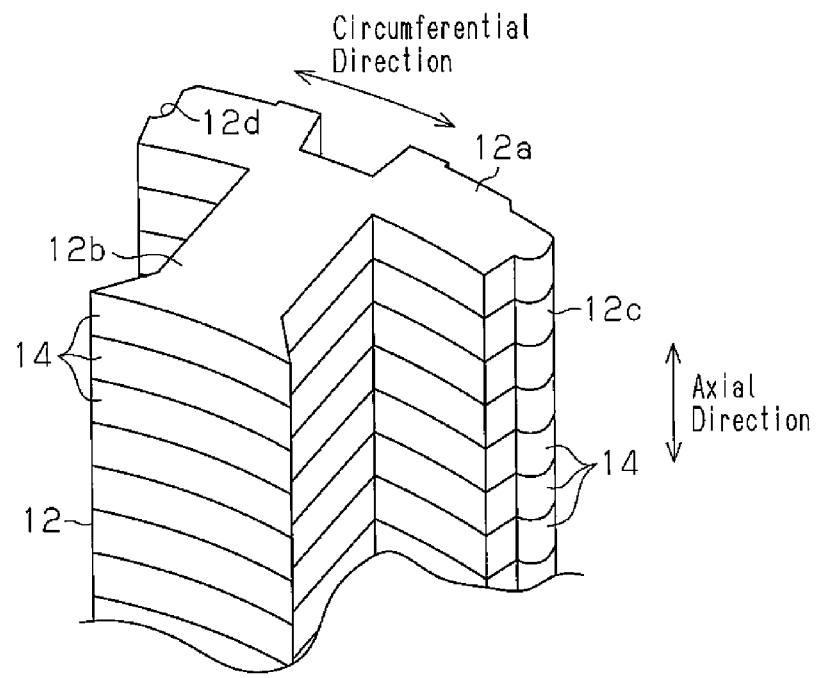
FIG. 4 is a perspective view showing a split core piece illustrated in FIG. 3A.

As illustrated in FIGS. 3A and 4, each of the split core pieces 12 is configured by a substantially plate-like yoke portion 12a extending in a circumferential direction and a tooth portion 12b, which extends from the yoke portion 12a perpendicularly to the yoke portion 12a. Each split core piece 12 has a shape substantially corresponding to a T shape as viewed in the axial direction. The axial direction, the circumferential direction, and the radial direction of each split core piece 12 coincide with the axial direction, the circumferential direction, and the radial direction of the stator core 11, respectively, in a state in which the twelve stator cores 12 are arranged in a circular shape as the stator core 11.

An engagement projection 12c, which projects toward a first circumferential side, is formed at a first circumferential end (the right end as viewed in FIGS. 3A and 4) of each of the yoke portions 12a. The engagement projection 12c extends axially from a first axial end to a second axial end in each yoke portion 12a and has a protruding shape. An engagement recess 12d, which is formed circumferentially, is formed at a second circumferential end (the left end as viewed in FIGS. 3A and 4) of each yoke portion 12a. The engagement recess 12d extends axially through the yoke portion 12a and opens toward a second circumferential side (the opposite side to the side toward which the engagement projection 12c projects) and in a radially outward direction. Each of the engagement recesses 12d is shaped to match the outline of each of the engagement projections 12c such that, in every adjacent pair of the split core pieces 12, the engagement projections 12c, which are formed in the yoke portions 12a, are engageable with the corresponding engagement recesses 12d from an outer radial side.

Each split core piece 12 is formed by a plurality of core sheets 14, which are each pressed out from a magnetic steel plate in a predetermined shape (in the illustrated embodiment, the same shape as the shape of each split core piece 12 as viewed in the axial direction) and laminated with one another in the thickness direction of the split core piece 12. In each split core piece 12, the laminating direction of the core sheets 14 coincides with the axial direction of the core sheets 14.

Figure 5:
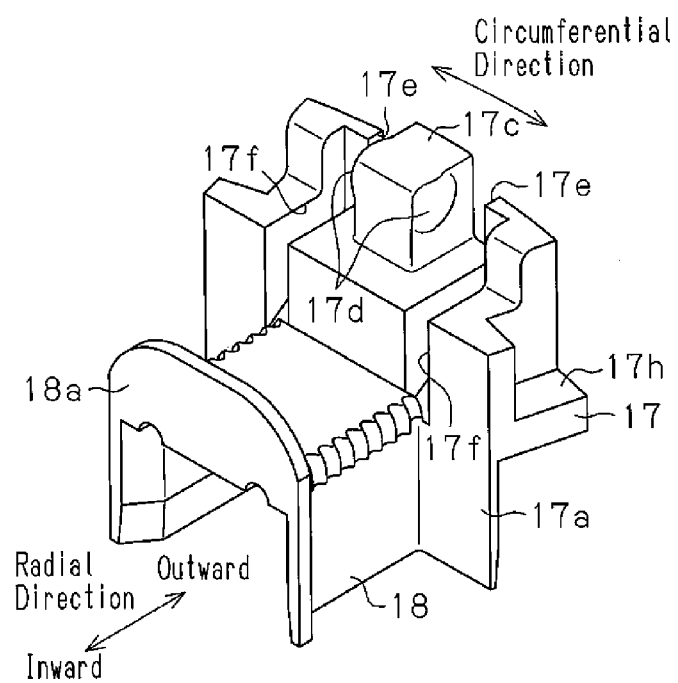
FIG. 5 is a perspective view showing an insulator illustrated in FIG. 3A.

As illustrated in FIGS. 1B and 3A, insulators 15, 16 are mounted on each split core piece 12 from opposite axial sides. The insulators 15, 16 are each formed of insulating plastic and cover opposite axial surfaces of the corresponding split core piece 12, opposite circumferential surfaces of the tooth 12b, and the inner radial surface of the yoke portion 12a. As to the insulators 15, 16, each insulator 15 is arranged at a first axial side (the left side as viewed in FIG. 1B, at which the holder 13 is located) of the associated split core piece 12. As illustrated in FIG. 5, each insulator 15 includes a yoke covering portion 17 and a tooth covering portion 18, which is formed integrally with the yoke covering portion 17. The axial direction, the circumferential direction, and the radial direction of each insulator 15 coincide with the axial direction, the circumferential direction, and the radial direction of the stator core 11, respectively, in the state where the insulators 15 are mounted in the associated split core pieces 12 that are arranged in a circular shape as the stator core 11, as illustrated in FIG. 3A.

The shape of each yoke covering portion 17 as viewed in the axial direction is substantially identical to the shape of each yoke portion 12a to cover a first axial surface of the yoke portion 12a. With reference to FIGS. 4 and 5, the yoke covering portion 17 has plate-like inner covering portions 17a, which are located at the inner radial ends of the yoke covering portion 17 and axially extend to cover the inner radial surface of the yoke portion 12a.

Figure 6A:
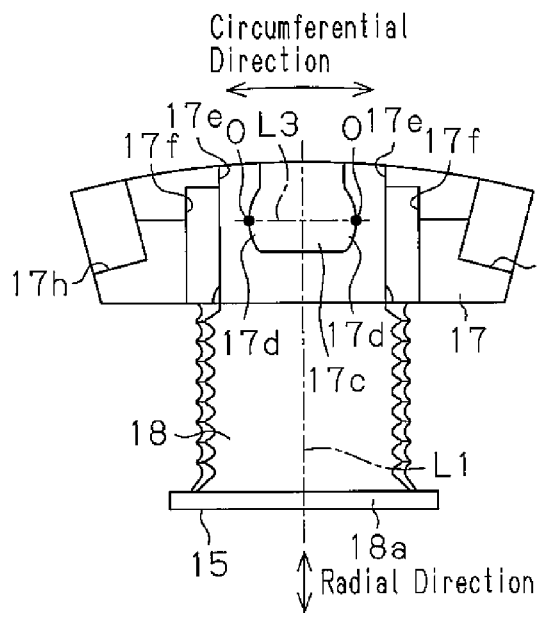
FIG. 6A is a front vide showing an insulator illustrated in FIG. 5.
Figure 6B:
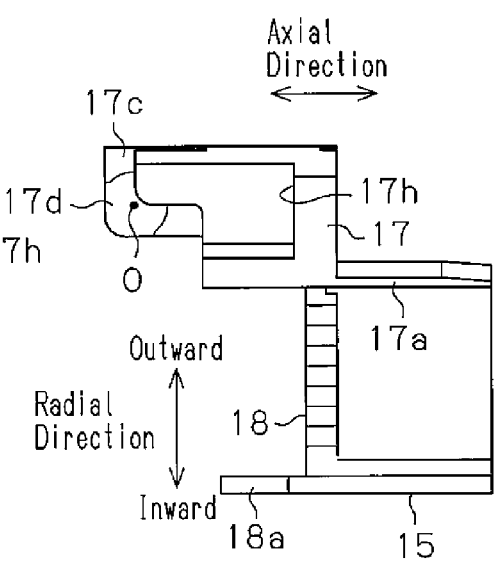
FIG. 6B is a side view showing the insulator in FIG. 5.
Figure 6C:
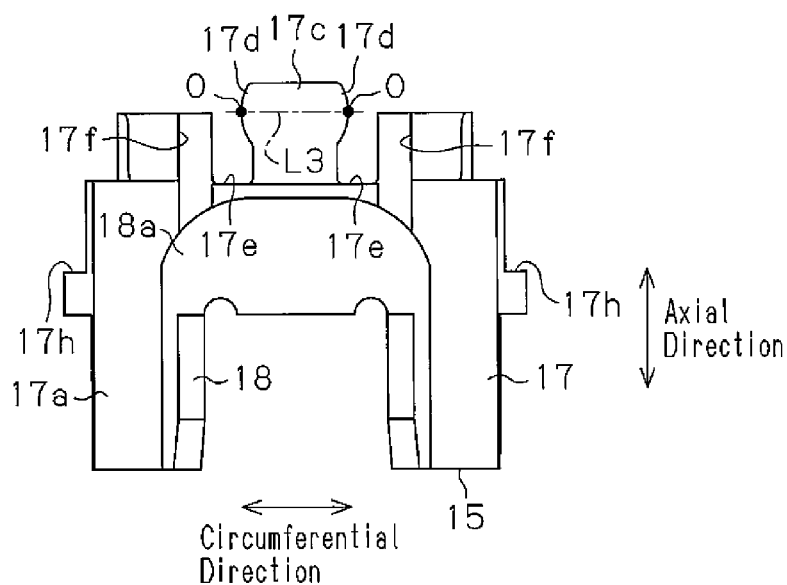
FIG. 6C is a side view showing the insulator in FIG. 5.

As illustrated in FIGS. 5, 6A, and 6C, a joint support portion 17c, which projects in the opposite axial direction to the projecting direction of each inner covering portion 17a, is formed in a circumferentially middle portion of each yoke covering portion 17. The joint support portion 17c is shaped like an axially extending rectangular pillar. The joint support portion 17c is a pillar for forming joint projections 17d, as will be described later. The joint support portion 17c does not necessarily have a rectangular shape. The opposite circumferential surfaces of the joint support portion 17c are a pair of flat surfaces each extending parallel to the line L1, which radially extends on the circumferential center of the insulator 15, and also to the axial direction. A pair of joint projections 17d are formed on the opposite circumferential surfaces of the joint support portion 17c. Each of the joint projections 17d is located radially inward at the distal end of the joint support portion 17c on the corresponding one of the opposite surfaces of the joint support portion 17c. Each joint projection 17d projects in a circumferential direction and forms a substantially round (semi-spherical) shape. The axial positions and the radial positions of the apexes O of the two joint projections 17d correspond to each other. The line extending on the apexes O of the joint projections 17d is the pivot axis L3. The pivot axis L3 is perpendicular to the aforementioned line L1, which extends on the circumferential center of the joint support portion 17c, and the axial direction.

Each yoke covering portion 17 has a pair of joint recesses 17e, which are formed at opposite circumferential sides of the joint support portion 17c. Each of the joint recesses 17e is formed by axially denting the yoke covering portion 17 to radially extend through the yoke covering portion 17. The axial position of the bottom surface of each joint recess 17e coincides with the axial position of the proximal end of the joint support portion 17c.

Each yoke covering portion 17 has a pair of holding recesses 17f, which are formed at opposite circumferential sides of the joint recesses 17e. Each of the holding recesses 17f is formed by axially denting a portion at the corresponding one of the circumferential sides of the joint recesses 17e. As a result, in the yoke covering portion 17, the two joint recesses 17e are arranged at the inner circumferential sides of the corresponding holding recesses 17f. The joint support portion 17c is located at the inner circumferential sides of the joint recesses 17e. Each one of the holding recesses 17f is formed at a position radially adjacent to the corresponding one of the opposite circumferential ends of the tooth covering portion 18. Each holding recess 17f opens toward the first axial side (the distal side of the joint support portion 17c) and also in a radially inward direction. The axial depth of each holding recess 17f is greater than the axial depth of each joint recess 17e. The holding recess 17f extends parallel to the line L1 in the range from the inner radial end to the outer radial end of the yoke covering portion 17 and has a uniform circumferential width. With reference to FIG. 3A, the circumferential width of each holding recess 17f is equal to the diameter of a coated conductive wire 19, which forms the corresponding one of the coils U1 to U4, V1 to V4, and W1 to W4.

As illustrated in FIGS. 5 and 6A, fixing recesses 17h are formed at the opposite circumferential ends of each yoke covering portion 17. Each of the fixing recesses 17h is formed by axially denting the corresponding one of the opposite circumferential ends of the yoke covering portion 17. Each fixing recess 17h opens toward the first axial side (the distal side of the joint support portion 17c) and in a radially outward direction. The fixing recess 17h also opens outward in a circumferential direction (toward the side opposite to the joint support portion 17c).

Each of the tooth covering portions 18 extends radially inward from the inner radial surface of the yoke covering portion 17 to define a right angle with respect to the inner covering portions 17a. Each tooth covering portion 18 is formed in a shape matching the outline of the first axial end of each tooth 12b to cover the first axial surface of the tooth 12b and the opposite circumferential surface of the tooth 12b. As a result, as viewed from the inner radial side, the tooth covering portion 18 has a substantial U shape that opens to the opposite side to the distal end of the joint support portion 17c. With reference to FIGS. 4 and 5, the radial length of each tooth covering portion 18 is substantially equal to the radial length of each tooth 12b. As illustrated in FIGS. 5 and 6B, an axially projecting prevention wall 18a is formed at the distal end of the tooth covering portion 18 (the inner radial end of the tooth covering portion 18).

Each insulator 15, which is configured as described above, is formed in a mirror-image shape with respect to a plane (not shown) including the line L1 and extending parallel to the axial direction. With reference to FIGS. 1B and 3A, the insulator 15 is attached to the first axial side of each split core piece 12 such that the first axial end of the tooth 12b is received in the tooth covering portion 18. In each split core piece 12 to which the insulator 15 is attached, the yoke covering portion 17 covers the first axial surface of the yoke portion 12a and the inner radial surfaces of the yoke portion 12a. Also, the tooth covering portion 18 covers the first axial surface of the tooth 12b and the opposite circumferential surfaces of the tooth 12b.

Figure 3B:
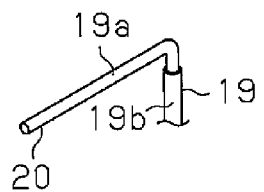
FIG. 3B is a perspective view showing a connection wire illustrated in FIG. 3A.

After the insulators 15, 16 are assembled with the respective twelve split core pieces 12, the conductive wire 19 forming the coils U1 to U4, V1 to V4, and W1 to W4 is wound around the tooth 12b of each split core piece 12 over the associated insulators 15, 16. In this manner, the coils U1 to U4, V1 to V4, and W1 to W4 are wound around the corresponding teeth 12b. As illustrated in FIG. 3B, each of the conductive wires 19 is configured by a conductive metal wire 19a and an insulating membrane 19b, which coats the outer periphery of the metal wire 19a. With reference to FIG. 3A, the insulators 15, 16 are arranged between the split core pieces 12 and the corresponding coils U1 to U4, V1 to V4, and W1 to W4. This ensures insulation between the split core pieces 12 and the coils U1 to U4, V1 to V4, and W1 to W4. The yoke covering portions 17 prevent the corresponding coils U1 to U4, V1 to V4, and W1 to W4 from displacing radially outward. The prevention walls 18a prevent the coils U1 to U4, V1 to V4, and W1 to W4 from displacing radially inward.

Connection wires 20, which are starting and finishing ends of each coil U1 to U4, V1 to V4, and W1 to W4 formed by the conductive wire 19, extend out to the first axial side (to the side closer to the viewer of the drawing as viewed in FIG. 3A). In the connection wires 20, the insulating membranes 19b are removed to expose the metal wires 19a. The connection wire 20 at the starting end of each coil U1 to U4, V1 to V4, and W1 to W4 and the connection wire 20 at the finishing end of the coil U1 to U4, V1 to V4, and W1 to W4 are extended out axially from the opposite circumferential sides of the corresponding tooth 12b in the vicinity of a proximal portion of the tooth 12b. A basal portion of each connection wire 20 is received in and held by the corresponding holding recess 17f, which is located in the vicinity of the connection wire 20. Each holding recess 17f maintains the basal portion of the corresponding connection wire 20 at a certain position with respect to the associated split core piece 12.

Figure 7:
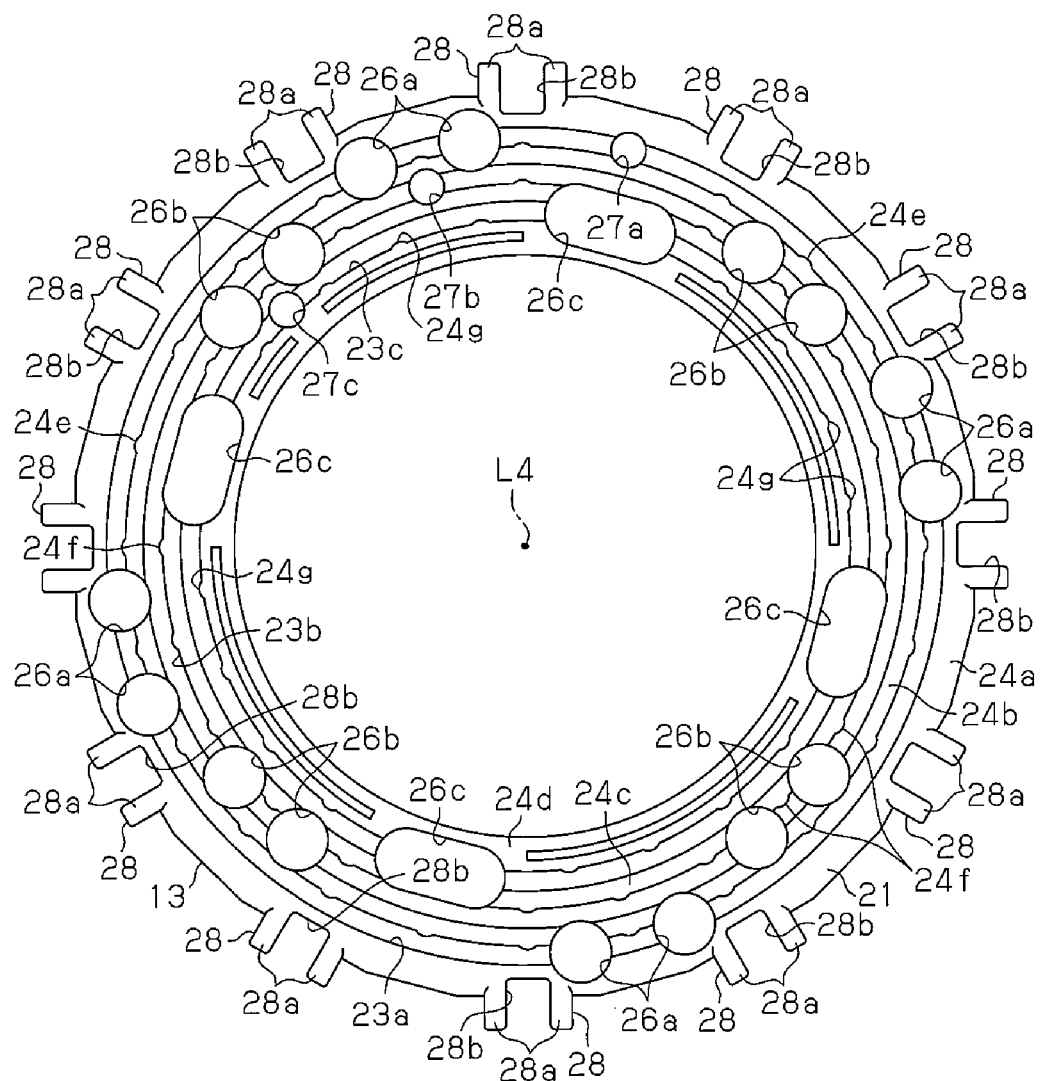
FIG. 7 is a back (rear) view showing a holder illustrated in FIG. 2.
Figure 9:
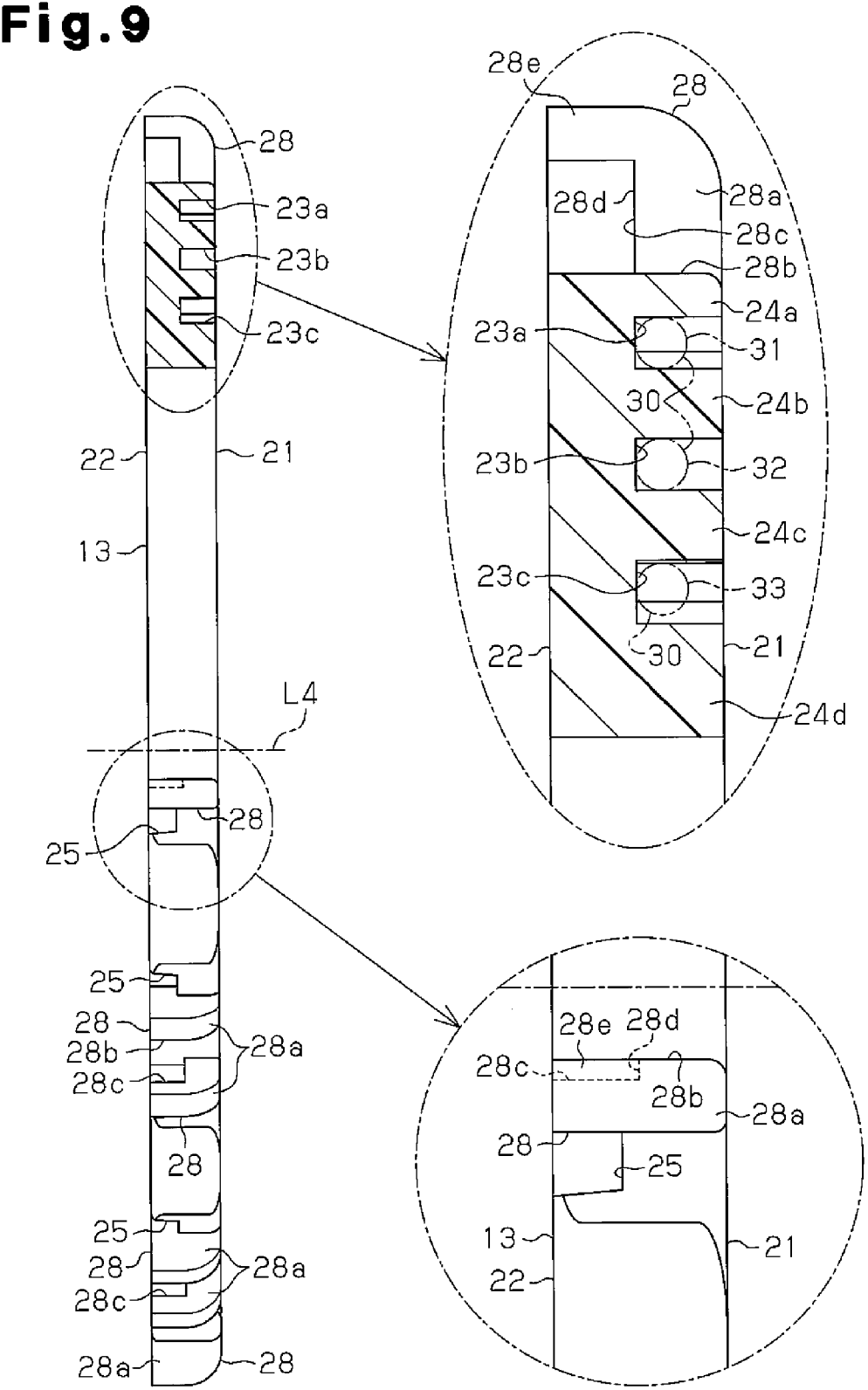
FIG. 9 is a half cross-sectional view showing the holder illustrated in FIG. 2.

As illustrated in FIG. 1B, the holder 13 is located at the first axial sides of the twelve split core pieces 12, which are arranged in a circular shape, or, in other words, the first axial sides of the coils U1 to U4, V1 to V4, and W1 to W4, which are arranged in the circumferential direction. Referring to FIG. 2, the holder 13 is formed of insulating plastic and has a circular plate-like shape. The radial width of the holder 13 is substantially equal to the radial width of each split core piece 12. As illustrated in FIGS. 1B and 7, a first accommodation groove 23a, a second accommodation groove 23b, and a third accommodation groove 23c are formed in a first axial surface of the holder 13, which is an opposing surface 21 axially opposing the coils U1 to U4, V1 to V4, and W1 to W4. The first to third accommodation grooves 23a to 23c are formed by axially denting the opposing surface 21 and each have a substantially circular (arcuate) shape extending in a circumferential direction of the holder 13. The first to third accommodation grooves 23a to 23c are formed concentrically about the axis L4 of the holder 13. The first accommodation groove 23a is located radially outermost among the first to third accommodation grooves 23a to 23c. The second accommodation groove 23b is arranged inward to the first accommodation groove 23a. The third accommodation groove 23c is located inward relative to the second accommodation groove 23b. With reference to FIG. 9, the radial width of each one of the first to third accommodation grooves 23a to 23c is substantially equal to the outer diameter of a conductive wire 30 forming the bus bars 31 to 33, as will be described later. The depth (the axial depth) of each of the first to third accommodation grooves 23a to 23c is greater than the outer diameter of the conductive wire 30.

As shown in FIGS. 7 and 9, the first to third accommodation grooves 23a to 23c are formed in the axial end of the holder 13 at the side corresponding to the opposing surface 21. As a result, first, second, third, and fourth positioning projections 24a, 24b, 24c, and 24d, which project axially toward the open sides of the corresponding first to third accommodation grooves 23a to 23c with respect to the bottom surfaces of the accommodation grooves 23a to 23c, are formed at the end of the holder 13 at the side corresponding to the opposing surface 21. The first positioning projection 24a is a substantially circular (arcuate) protrusion extending along the outer peripheral end of the holder 13 at a position radially outward to the first accommodation groove 23a. The second positioning projection 24b is a substantially circular (arcuate) protrusion that extends circumferentially between the first accommodation groove 23a and the second accommodation groove 23b. The third positioning projection 24c is a substantially circular (arcuate) protrusion that extends circumferentially between the second accommodation groove 23b and the third accommodation groove 23c. The fourth positioning projection 24d is a substantially circular (arcuate) protrusion extending along the inner peripheral end of the holder 13 at a position radially inward relative to the third accommodation groove 23c. Like the first to third accommodation grooves 23a to 23c, the first to fourth positioning projections 24a to 24d are formed concentrically about the axis L4 of the holder 13. The axial height of each of the first to fourth positioning projections 24a to 24d is greater than the outer diameter of the conductive wire 30.

Figure 10:
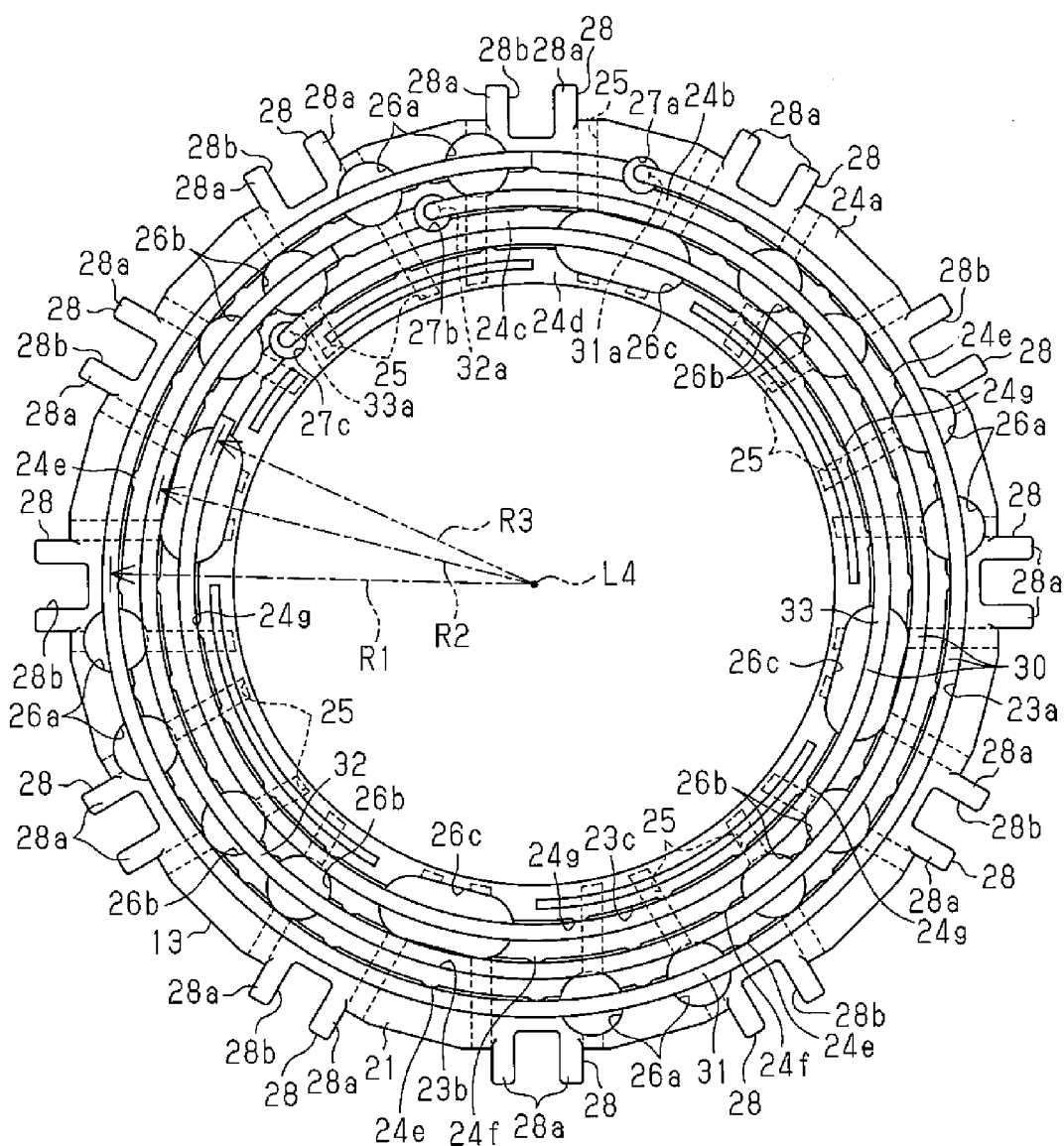
FIG. 10 is a back view showing the holder in FIG. 2 in a state holding bus bars.

As illustrated in FIGS. 7 and 10, a plurality of (in the illustrated embodiment, twenty-three) first holding projections 24e, which project into the first accommodation groove 23a, are formed on the surface of the second positioning projection 24b at the side corresponding to the first accommodation groove 23a. The first holding projections 24e are circumferentially spaced apart on the surface of the second positioning projection 24b at the side corresponding to the first accommodation groove 23a. The radial width of the portion of the first accommodation groove 23a corresponding to each first holding projection 24e is equal to or slightly smaller than the outer diameter of the conductive wire 30. A plurality of (in the illustrated embodiment, nineteen) second holding projections 24f, which project into the second accommodation groove 23b, are formed on the surface of the third positioning projection 24c at the side corresponding to the second accommodation groove 23b. The second holding projections 24f are circumferentially spaced apart on the surface of the third positioning projection 24c at the side corresponding to the second accommodation groove 23b. The radial width of the portion of the second accommodation groove 23b corresponding to each second holding projection 24f is equal to or slightly smaller than the outer diameter of the conductive wire 30. A plurality of (in the illustrated embodiment, sixteen) third holding projections 24g, which project into the third accommodation groove 23c, are formed on the surface of the fourth positioning projection 24d at the side corresponding to the third accommodation groove 23c. The third holding projections 24g are circumferentially spaced apart on the surface of the fourth positioning projection 24d at the side corresponding to the third accommodation groove 23c. The radial width of the portion of the third accommodation groove 23c corresponding to each third holding projection 24g is equal to or slightly smaller than the outer diameter of the conductive wire 30.

Figure 8:
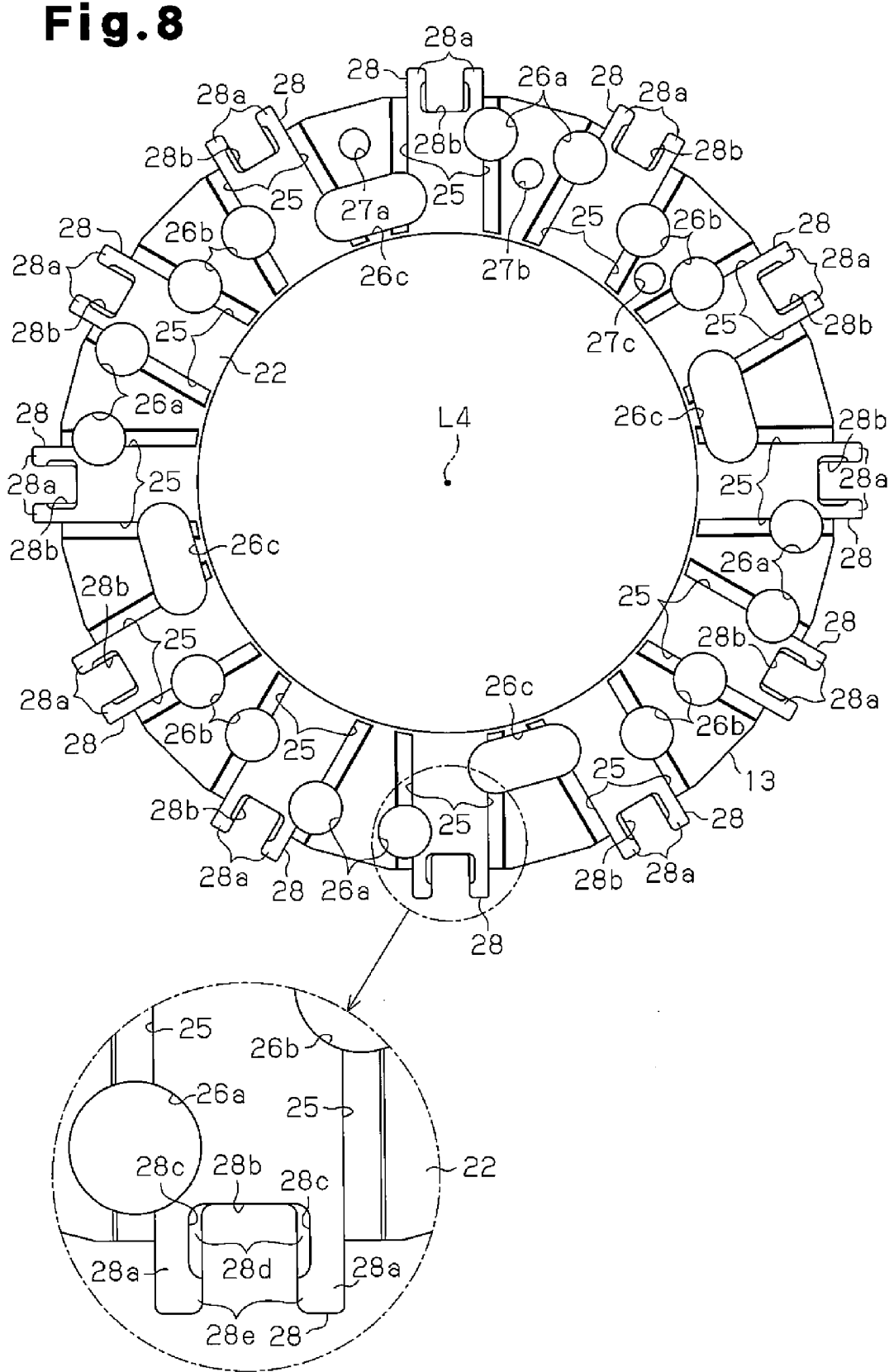
FIG. 8 is a front view showing the holder illustrated in FIG. 2.
Figure 11:
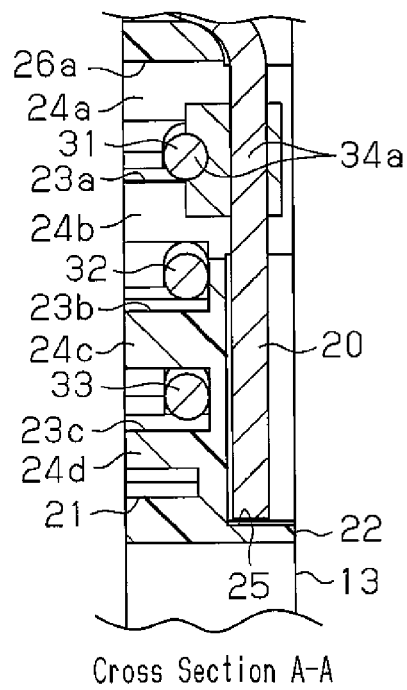
FIG. 11 is a cross-sectional view showing the holder holding the bus bars, taken along line A-A of FIG. 2.
Figure 12:
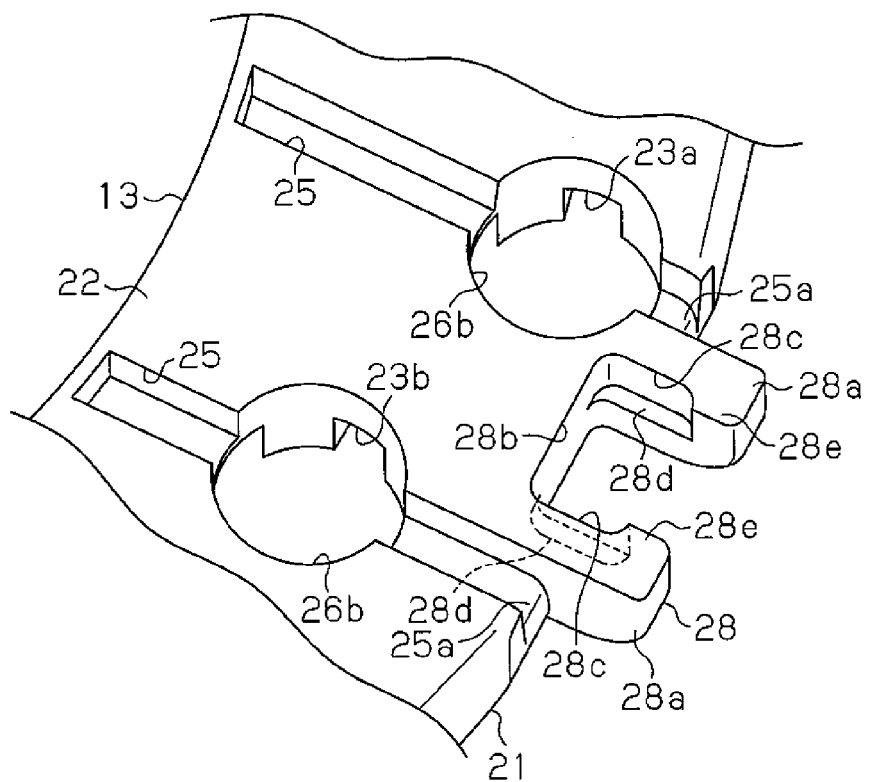
FIG. 12 is an enlarged perspective view showing a portion of the holder illustrated in FIG. 2.

As shown in FIG. 8, a plurality of guide grooves 25 are formed in a second axial surface of the holder 13, or, in other words, a non-opposing surface 22, which is the axial surface of the holder 13 located opposite to the opposing surface 21. In the illustrated embodiment, circumferentially adjacent two of the guide grooves 25 form a pair. The holder 13 thus includes twelve pairs of guide grooves 25, which are a total of twenty-four guide grooves 25. The twelve pairs of the guide grooves 25 are arranged at the corresponding twelve positions in the holder 13 that are circumferentially spaced apart at equal angular intervals (in the illustrated embodiment, by 30°). Each of the guide grooves 25 is formed by axially denting the non-opposing surface 22 and extends substantially in a radial direction from the outer peripheral end to the inner peripheral end of the holder 13. The guide grooves 25 in each pair extend parallel to each other and are circumferentially spaced apart at an interval equal to the interval between the two connection wires 20 that are the starting end and the finishing end of each coil U1 to U4, V1 to V4, and W1 to W4, as shown in FIGS. 2 and 3. With reference to FIG. 8, each of the guide grooves 25 opens toward the second axial side (the opposite side to the opposing surface 21) and in a radially outward direction. The width and depth of each guide groove 25 are uniform from the outer radial end to the inner radial end of the guide groove 25. As illustrated in FIG. 2, the width (the circumferential width) of each guide groove 25 is substantially equal to the diameter of each connection wire 20 (the diameter of each metal wire 19a). Referring to FIG. 11, the depth (the axial depth) of each guide groove 25 is greater than the diameter of each connection wire 20 (the diameter of each metal wire 19a). With reference to FIG. 12, a curved guide portion 25a, which is curved in an arcuate shape, is formed at the outer radial end of the bottom surface of each guide groove 25. As a result, the outer radial end of the bottom of the guide groove 25 is formed as a round chamfered surface. The radius of curvature of each curved guide portion 25a is set to a value greater than or equal to the diameter of each connection wire 20.

As shown in FIG. 8, the holder 13 has first connecting portions 26a, second connecting portions 26b, and third connecting portions 26c, which are axial holes extending through the holder 13. The holder 13 of the illustrated embodiment has eight first connecting portions 26a. Viewing the holder 13 from the side corresponding to the non-opposing surface 22, the first connecting portions 26a are located in correspondence with corresponding four couples of guide grooves 25 that are located at positions spaced apart by 90°. Specifically, each aforementioned couple of guide grooves 25 are middle two guide grooves 25 in two circumferentially adjacent pairs of parallel guide grooves 25, or circumferentially successive consecutive four guide grooves 25. These couples of guide grooves 25 corresponding to the first connecting portions 26a are located at four positions spaced apart by 90°. With reference to FIG. 7, with the holder 13 viewed from the side corresponding to the opposing surface 21, the radial positions of the eight first connecting portions 26a are close to the outer periphery of the holder 13 and substantially correspond to the radial position of the first accommodation groove 23a. As viewed from the side corresponding to the opposing surface 21, each of the first connecting portions 26a radially intersects the first accommodation groove 23a and has a circular shape. Referring to FIG. 2, the diameter of each first connecting portion 26a is greater than the diameter of the metal wire 19a or the diameter of the conductive wire 30.

Referring to FIG. 8, the holder 13 of the illustrated embodiment has eight second connecting portions 26b. Viewing the holder 13 from the side corresponding to the non-opposing surface 22, the second connecting portions 26b are located in correspondence with corresponding four couples of guide grooves 25 that are located at positions spaced apart by 90°. Each of these couples of the guide grooves 25 are middle two guide grooves 25 that are located adjacent clockwise relative to the corresponding pair of the first connecting portions 26a, which are arranged at one of the four positions circumferentially spaced apart by 90°. With reference to FIG. 7, with the holder 13 viewed from the side corresponding to the opposing surface 21, the radial positions of the eight second connecting portions 26b are arranged substantially in a radial middle portion of the holder 13 and correspond to the radial position of the second accommodation groove 23b. As viewed from the side corresponding to the opposing surface 21, each of the second connecting portions 26b radially intersects the second accommodation groove 23b and has a circular shape. Referring to FIG. 2, the diameter of each second connecting portion 26b is greater than the diameter of the metal wire 19a or the diameter of the conductive wire 30.

As shown in FIG. 8, the holder 13 of the illustrated embodiment has four third connecting portions 26c. Viewing the holder 13 from the side corresponding to the non-opposing surface 22, the four third connecting portions 26c are located in correspondence with corresponding four couples of guide grooves 25 arranged at positions spaced apart by 90°. Each aforementioned couple of the guide grooves 25 are two guide grooves 25 located between the corresponding first connecting portions 26a and second connecting portions 26b. With reference to FIG. 7, with the holder 13 viewed from the side corresponding to the opposing surface 21, the radial positions of the four third connecting portions 26c are close to the inner periphery of the holder 13 and substantially correspond to the radial position of the third accommodation groove 23c. As viewed from the side corresponding to the opposing surface 21, each of the third connecting portions 26c radially intersects the third accommodation groove 23c and has an elongated hole-like shape that circumferentially intersects the two guide grooves 25 located between the corresponding first connecting portions 26a and second connecting portions 26b. Referring to FIG. 2, the radial width of each third connecting portion 26c is greater than the diameter of the metal wire 19a or the diameter of the conductive wire 30. The circumferential width of the third connecting portion 26c is greater than the diameter of the metal wire 19a or the diameter of the conductive wire 30.

As illustrated in FIGS. 8 and 10, the holder 13 has a first insertion hole 27a, a second insertion hole 27b, and a third insertion hole 27c, which are axial holes extending through the holder 13. The first insertion hole 27a axially extends through the holder 13 from the bottom surface of the first accommodation groove 23a to the non-opposing surface 22 at a position radially outward to one (the uppermost one of the third connecting portions 26c as viewed in FIG. 8) of the four third connecting portions 26c. The first insertion hole 27a has a circular shape as viewed in the axial direction and the inner diameter of the first insertion hole 27a exceeds the outer diameter of the conductive wire 30. With the holder 13 viewed from the side corresponding to the non-opposing surface 22 (as is shown in the state illustrated in FIG. 8), the second insertion hole 27b axially extends through the holder 13 from the bottom surface of the second accommodation groove 23b to the non-opposing surface 22 at a position between the two first connecting portions 26a that are adjacent clockwise to the first insertion hole 27a. The second insertion hole 27b has a circular shape as viewed in the axial direction and the inner diameter of the second insertion hole 27b exceeds the outer diameter of the conductive wire 30. With the holder 13 viewed from the side corresponding to the non-opposing surface 22, the third insertion hole 27c axially extends through the holder 13 from the bottom surface of the third accommodation groove 23c to the non-opposing surface 22 at a position between the two second connecting portions 26b that are adjacent clockwise to the second insertion hole 27b. The third insertion hole 27c has a circular shape as viewed in the axial direction and the inner diameter of the third insertion hole 27c exceeds the outer diameter of the conductive wire 30.

With reference to FIGS. 7 and 8, twelve joint portions 28, which are employed by the same number as the number of the split core pieces 12, are arranged in an outer peripheral portion of the holder 13. The joint portions 28 are formed at twelve positions in the outer peripheral portion of the holder 13, each of which is located between the corresponding pair of the guide grooves 25. In other words, the joint portions 28 are circumferentially spaced apart at equal angular intervals (in the illustrated embodiment, by 30°) in the holder 13. Each of the joint portions 28 has a pair of projected joint portions 28a, which project radially outward from the outer peripheral end of the holder 13. The projected joint portions 28a of each pair are circumferentially spaced apart and an insertion recess 28b is formed between the two joint projections 28c. With reference to FIGS. 8 and 6C, the circumferential width of each of the projected joint portions 28a is substantially equal to the circumferential width of each joint recess 17e formed in the yoke covering portion 17 of the insulator 15. The radial length (the projecting amount) of each projected joint portion 28a is slightly smaller than the axial depth of each joint recess 17e. Referring to FIGS. 9 and 6B, the axial length of the projected joint portion 28a is substantially equal to the axial thickness of the holder 13 and slightly smaller than the radial length of each joint support portion 17c.

With reference to FIG. 8, each of the insertion recesses 28b opens to the opposite axial sides of the holder 13 and also in a radially outward direction. The circumferential width of each insertion recess 28b is substantially equal to the circumferential width of each joint support portion 17c. The radial depth of the insertion recess 28b is substantially equal to the axial length of the joint support portion 17c (the length between the proximal end and the distal end of the joint support portion 17c).

Referring to FIGS. 8, 9, and 12, a pair of engagement recesses 28c are formed in the inner peripheral surface of each insertion recess 28b. Each pair of engagement recesses 28c are formed by axially denting portions in the proximities of the associated pair of the projected joint portions 28a from the side corresponding to the non-opposing surface 22. The engagement recesses 28c each open toward the interior of the associated insertion recess 28b and the first axial side of the holder 13 (the side corresponding to the non-opposing surface 22). The circumferential depth (the depth in a circumferential direction of the holder 13) of each engagement recess 28c is equal to the height (the projecting amount) of each joint projection 17d (see FIG. 6A). The radial width (the dimension in a radial direction of the holder 13) of the engagement recess 28c is equal to the diameter the joint projection 17d. The axial width (the dimension in the axial direction of the holder 13) of the engagement recess 28c is equal to the diameter of the joint projection 17d. The bottom surface of each engagement recess 28c is an axial engagement surface 28d, which is a flat surface perpendicular to the axial direction of the holder 13. Each pair of engagement recesses 28c are arranged in the inner peripheral surface of the associated insertion recess 28b to form a pair of engagement projections 28e, which are arranged radially outward to the engagement recesses 28c and each projected in a circumferential direction. Each pair of engagement projections 28c are radially adjacent to the associated pair of engagement recesses 28c.

As illustrated in FIG. 2, the insulator 15, which is assembled with the corresponding split core piece 12, is joined to each joint portion 28 of the holder 13. In other words, the split core pieces 12 are joined to the holder 13 through the associated insulators 15, which are assembled with the split core pieces 12. In the illustrated embodiment, the stator core 11 is configured by the split core pieces 12, the holder 13, and the insulators 15, through which the split core pieces 12 are joined to the holder 13.

The stator core 11 of the illustrated embodiment operates in the manner described below.

Figure 13:
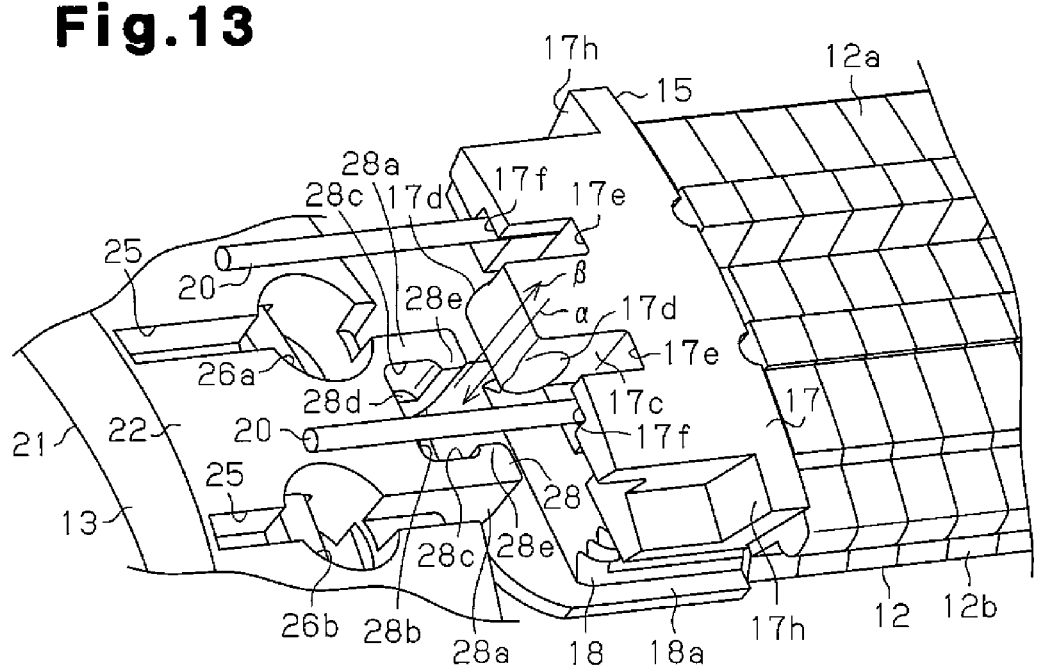
FIG. 13 is an enlarged perspective view showing a portion of the holder and a split core piece illustrated in FIG. 2.

As illustrated in FIG. 13, the joint support portion 17c and the joint projections 17d of each insulator 15 are inserted in the corresponding insertion recess 28b and the engagement recesses 28c in the axial direction of the holder 13 from the side corresponding to the non-opposing surface 22, thus joining the insulator 15 to the corresponding joint portion 28. In FIG. 13, the coil U2, which is wound around the tooth 12b, is not shown. Arrow a in FIG. 13 represents the movement direction of the insulator 15 at the time when the joint support portion 17c is joined to the joint portion 28. Specifically, to join the joint support portion 17c to the joint portion 28, as represented by arrow a, the insulator 15 and the split core piece 12, to which the insulator 15 has been attached, are moved relative to the holder 13 from the side corresponding to the non-opposing surface 22 to the side corresponding to the opposing surface 21 in the axial direction of the holder 13. In this manner, the joint support portion 17c is received in the insertion recess 28b and the two joint projections 17d are inserted in the corresponding engagement recesses 28c. In this state, the distal portions of the two projected joint portions 28a are received in the corresponding joint recesses 17e. As a result, with reference to FIG. 14, the joint support portion 17c and the joint projections 17d are mounted in the insertion recess 28b and the engagement recesses 28c, respectively. This pivotably connects one axial end of each split core piece 12 to the holder 13 through the associated insulator 15. By inserting the joint projections 17d in the corresponding engagement recesses 28c, the radial position, the circumferential position, and the axial position of the joint projections 17d are set. In each split core piece 12 of the illustrated embodiment, a substantial middle portion of the yoke portion 12a in a circumferential direction (a circumferentially middle portion of the split core piece 12) at the corresponding axial end of the yoke portion 12a is pivotably connected to the corresponding joint portion 28 of the holder 13 through the associated insulator 15.

Figure 15:
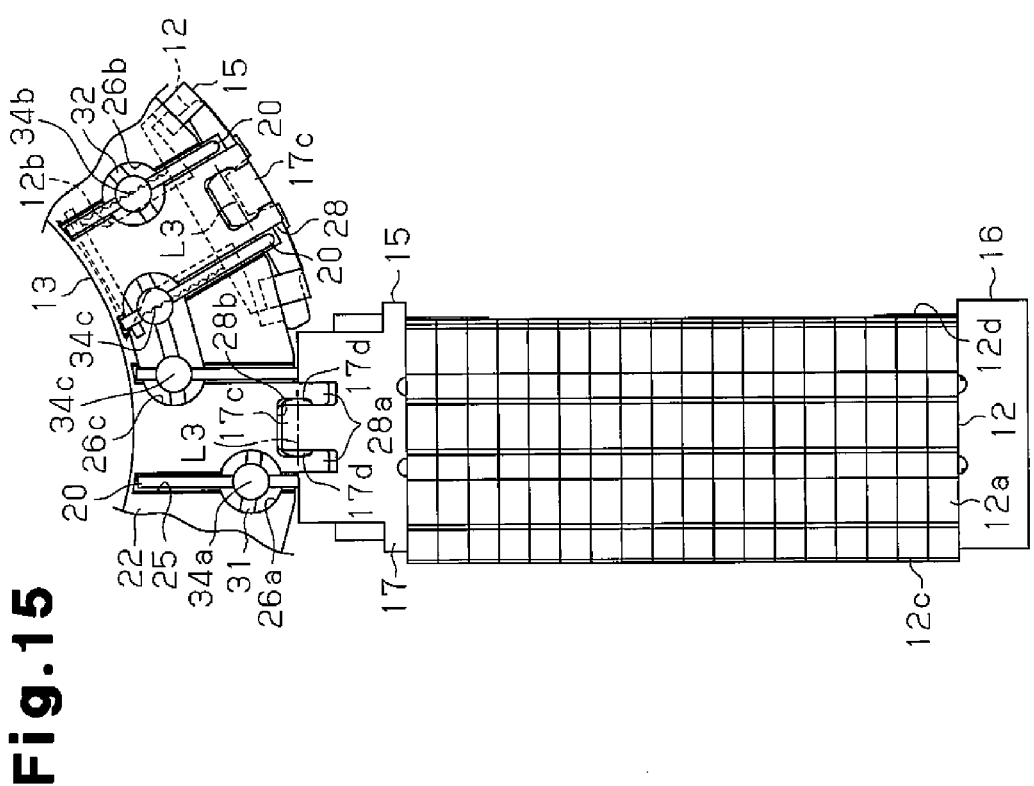
FIG. 15 is an enlarged view showing a portion of the holder and the split core piece illustrated in FIG. 2.

With reference to FIG. 2, the twelve split core pieces 12 are joined to the holder 13 through the associated insulators 15 at the corresponding twelve circumferential positions spaced apart at equal angular intervals (in the illustrated embodiment, by 30°). The split core pieces 12 are thus arranged in a circumferential direction of the holder 13. By joining the first axial ends of the split core pieces 12 to the holder 13, the split core pieces 12 are connected together in an annular shape by means of the holder 13. As illustrated in FIG. 15, by inserting each joint support portion 17c into the corresponding insertion recess 28b, the pivot axis L3 is caused to extend perpendicular to a radial direction and the axial direction of the holder 13 at the circumferential center of the insulator 15. Each split core piece 12 can be pivoted relative to the holder 13 about the joint portion 28, the distal portion of the joint support portion 17c, and the joint projections 17d, which are joining portions, such that the second axial end (the axial end at which the insulator 16 is mounted) of the split core piece 12 moves in a radial direction of the holder 13. More specifically, each split core piece 12 can be pivoted relative to the holder 13 about the pivot axis L3, which is perpendicular to the radial direction and the axial direction of the holder 13. Regarding the two split core pieces 12 illustrated in FIG. 15, the split core piece 12 located at the left side is arranged such that the axial direction of the split core piece 12 corresponds to a radial direction of the holder 13. If this split core piece 12 is pivoted about the pivot axis L3 such that the opposite axial end of the split core piece 12 moves in a radial direction of the holder 13 and proceeds radially inward to the holder 13, the split core piece 12 is switched to the state in which the distal end of the tooth 12b faces inward in a radial direction of the holder 13, as illustrated in FIGS. 2 and 3, which is the state of the split core piece 12 illustrated at the right side in FIG. 15. When the split core piece 12 is pivoted relative to the holder 13, the opposite axial end of the split core piece 12 is moved also in the axial direction of the holder 13.

Figure 14:
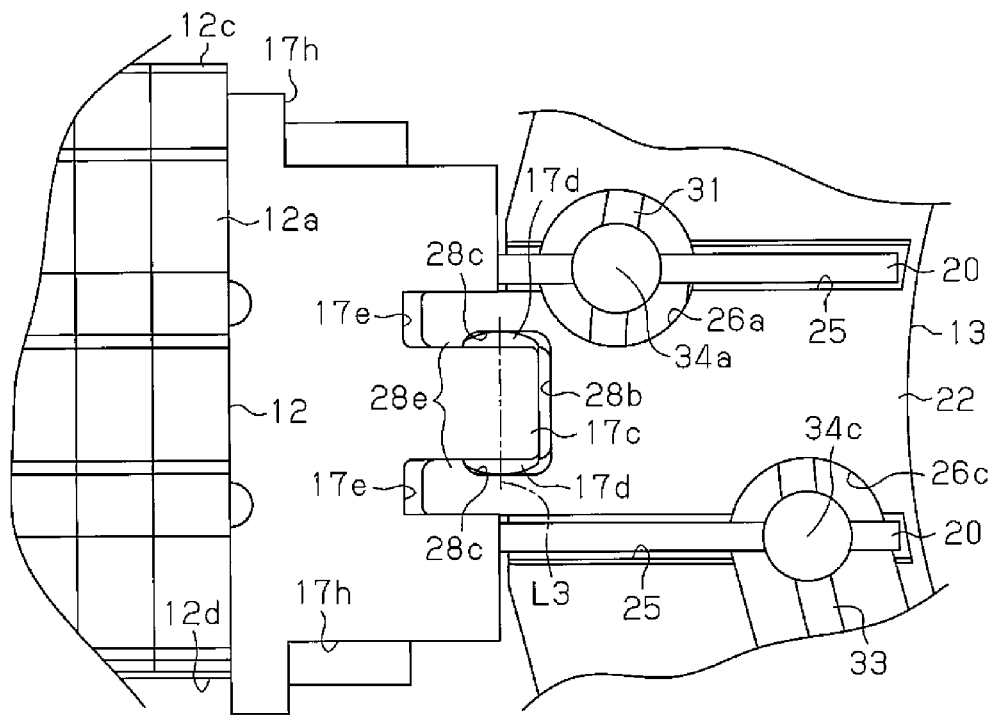
FIG. 14 is an enlarged view showing a portion of the holder and the split core piece illustrated in FIG. 2.

As illustrated in FIG. 14, when each joint support portion 17c is received in the corresponding insertion recess 28b, the two projected joint portions 28a are arranged at the opposite circumferential sides of the joint support portion 17c. The projected joint portions 28a thus prevent circumferential movement of the insulator 15 relative to the holder 13. The insulator 15 is also prevented from moving circumferentially relative to the holder 13 through contact between the joint projections 17d and the inner wall surfaces of the corresponding engagement recesses 28c. As a result, each split core piece 12 is prevented from moving circumferentially relative to the holder 13.

When the joint support portion 17 is to move radially outward relative to the holder 13, the joint projections 17d contact the corresponding engagement projections 28e. The engagement projections 28e thus prevent the insulator 15 from moving radially outward relative to the holder 13. As a result, the split core piece 12 is prevented from moving outward in a radial direction of the holder 13 and separating (disconnecting) from the holder 13.

With reference to FIGS. 13 and 14, when the joint support portion 17c in the insertion recess 28b is to move toward the opposing surface 21 in the axial direction of the holder 13 (as indicated by arrow α), the joint projections 17d contact the axial engagement surfaces 28d. The axial engagement surfaces 28d thus prevent the joint support portion 17c received in the insertion recess 28b from moving toward the opposing surface 21. This prevents each split core piece 12 from moving from the side corresponding to the non-opposing surface 22 to the side corresponding to the opposing surface 21 in the axial direction of the holder 13 (as indicated by arrow α) and separating (disconnecting) from the holder 13.

The insertion recess 28b opens to the opposite axial sides of the holder 13. The engagement recesses 28c open to one axial side (the opposite side to the opposing surface 21) of the holder 13. Accordingly, as illustrated in FIG. 13, when the axial direction of each split core piece 12 corresponds to a radial direction of the holder 13 and the split core piece 12, together with the insulator 15, is moved relative to the holder 13 from the side corresponding to the opposing surface 21 to the side corresponding to the non-opposing surface 22 in the axial direction of the holder 13 (as represented by arrow β in FIG. 13), the joint support portion 17c and the joint projections 17d are removed from the insertion recess 28b and the corresponding engagement recesses 28c, respectively. In this manner, the joint support portion 17c is disconnected from the joint portion 28. In other words, by moving each split core piece 12 and the associated insulator 15 relative to the holder 13 from the side corresponding to the opposing surface 21 to the side corresponding to the non-opposing surface 22 in the axial direction of the holder 13 with the axial direction of the split core piece 12 corresponding to a radial direction of the holder 13, the split core piece 12 is separated from the holder 13. As has been described, in each split core piece 12 of the illustrated embodiment, one of the axial ends of the split core piece 12 is joined to the joint portion 28 in manners detachable/attachable and pivotable relative to the holder 13 through relative movement between the holder 13 and the split core piece 12 in the axial direction of the holder 13.

As illustrated in FIG. 3A, the twelve split core pieces 12 joined to the holder 13 are pivoted about the pivot axis L3 relative to the holder 13 and arranged in a circular shape such that the corresponding twelve yoke portions 12a form a circular shape as a whole and that the distal ends of the twelve teeth 12b all face radially inward. The split core pieces 12 are arranged in the circular shape at the side of the holder 13 corresponding to the opposing surface 21. The engagement projection 12c of each of the yoke portions 12a is engaged with the engagement recess 23d of the corresponding circumferentially adjacent one of the yoke portions 12a from an outer radial side.

In the stator core 11, the split core pieces 12 are circumferentially spaced apart at equal angular intervals (in the illustrated embodiment, by 30°). As illustrated in FIGS. 1B and 2, the holder 13 and the twelve split core pieces 12, which are arranged in the circular shape, are arranged coaxially (the axes of the holder 13 and the split core pieces 12 coincide with one another). The holder 13 is located radially inward to the outer periphery of each split core piece 12. In the illustrated embodiment, the outer diameter of the holder 13 is slightly smaller than the outer diameter of the circular shape in which the split core pieces 12 are arranged.

As illustrated in FIG. 3A, when the twelve split core pieces 12 are circumferentially arranged, the coils U1 to U4, V1 to V4, and W1 to W4, which are wound around the corresponding teeth 12b, are also circumferentially arranged and spaced apart at equal angular intervals. In the illustrated embodiment, the coils U1 to U4, V1 to V4, and W1 to W4 are arranged circumferentially in the order of the coil W4, the coil U1, the coil V1, the coil W1, the coil U2, the coil V2, the coil W2, the coil U3, the coil V3, the coil W3, the coil U4, and the coil V4 in a clockwise direction from the top of FIG. 3A. With reference to FIGS. 1B and 3A, when arranged circumferentially, one axial end of each of the coils U1 to U4, V1 to V4, and W1 to W4 axially faces the opposing surface 21 of the holder 13.

As illustrated in FIG. 2, the basal portions of the two connection wires 20, which are the first and second connection wires 20, of each coil U1 to U4, V1 to V4, W1 to W4 are held by the corresponding holding recesses 17f. The circumferential positions of the basal portions of the connection wires 20 correspond to the circumferential positions of the twelve pairs of guide grooves 25. That is, the circumferential positions of the basal portions of the twenty-four connection wires 20 correspond to the circumferential positions of the twenty-four guide grooves 25, which are formed in the holder 13. The distal portion of each connection wire 20 is received in the corresponding guide groove 25 at the side corresponding to the non-opposing surface 22. The distal portion of the connection wire 20 is thus guided by the guide groove 25 to extend substantially in a radial direction of the holder 13 (substantially perpendicular to the axial direction of the holder 13). Since each connection wire 20 is extended out in the axial direction of the stator core 11, the connection wire 20 is curved between the basal portion and the distal end such that the connection wire 20 extends substantially in a radial direction of the holder 13. In the illustrated embodiment, each connection wire 20 is curved inward in a radial direction of the holder 13 at the outer periphery of the holder 13 such that the distal end of the connection wire 20 faces inward in a radial direction of the holder 13 at a position located distally with respect to the portion of the connection wire 20 held by the corresponding holding recess 17f. The curved portion of each connection wire 20 is formed in a shape matching the curved guide portion 25a (see FIG. 12). The length of the portion of each connection wire 20 located distally from the curved portion (the portion of the connection wire 20 that extends substantially in a radial direction of the holder 13) is substantially equal to the radial length of the holder 13. The distal end of each connection wire 20 is arranged in the vicinity of the inner peripheral end of the holder 13. When connection wires 20 are mounted in the corresponding guide grooves 25, the connection wires 20 are arranged circumferentially in parallel without being overlapped as viewed in the axial direction and extend perpendicular to the axial direction of the holder 13. Each connection wire 20 is received in the corresponding guide groove 25 to radially intersect the corresponding one of the first connecting portions 26a, the second connecting portions 26b, and the third connecting portions 26c. The connection wire 20 is thus exposed through the intersected connecting portion to the side corresponding to the opposing surface 21 (the surface of the holder 13 spaced from the viewer with respect to the drawing surface as viewed in FIG. 2).

Referring to FIGS. 10 and 11, the bus bars 31 to 33 (which are the U-phase bus bar 31, the V-phase bus bar 32, and the W-phase bus bar 33), each of which is formed by the conductive wire 30, are arranged at the axial end of the holder 13 at the side corresponding to the opposing surface 21. The conductive wire 30 of the illustrated embodiment is a conductive metal wire having a circular cross section (for example, a tinned copper wire).

The U-phase bus bar 31 is formed by curving one conductive wire 30 in an arcuate shape. The radius of curvature of the U-phase bus bar 31 having the arcuate shape is equal to the radius of curvature of the first accommodation groove 23a. As illustrated in FIG. 3A, the radius R1 of the U-phase bus bar 31 is smaller than the distance between the outer radial end of each coil U1 to U4, V1 to V4, and W1 to W4 and the axis L5 of the stator core 11 and greater than the distance between the inner radial end of the coil U1 to U4, V1 to V4, and W1 to W4 and the axis L5 of the stator core 11. Referring to FIG. 10, the opposite circumferential ends of the U-phase bus bar 31 face each other in the circumferential direction. The U-phase bus bar 31 thus substantially forms a circular shape. A U-phase power feeding portion 31a, which is curved with respect to the U-phase bus bar 31 to extend in the axial direction, is formed integrally with the U-phase bus bar 31 at one of the circumferential ends of the U-phase bus bar 31. The axial length of the U-phase power feeding portion 31a is greater than the axial length of the holder 13. With reference to FIGS. 10 and 11, the U-phase bus bar 31 is mounted in the first accommodation groove 23a from the side corresponding to the opposing surface 21, with the U-phase power feeding portion 31a received in the first insertion hole 27a from the side corresponding to the opposing surface 21. When mounted in the first accommodation groove 23a, the U-phase bus bar 31 is clamped by the first positioning projection 24a, which is arranged radially outward to the first accommodation groove 23a, and the first holding projections 24e, which are formed in the second positioning projection 24b located radially inward to the first accommodation groove 23a. As a result, the U-phase bus bar 31 is radially positioned relative to the holder 13 by the first positioning projection 24a and the first holding projections 24e. Radial movement of the U-phase bus bar 31 relative to the holder 13 is restricted by the first positioning projection 24a and the first holding projections 24e. In this state, the U-phase bus bar 31 is held by the holder 13. As illustrated in FIG. 2, the U-phase bus bar 31 mounted in the first accommodation groove 23a is exposed to the side corresponding to the non-opposing surface 22 through the eight first connecting portions 26a.

As illustrated in FIG. 10, the V-phase bus bar 32 is formed by curving one conductive wire 30 in an arcuate shape. The radius of curvature of the V-phase bus bar 32 having the arcuate shape is equal to the radius of curvature of the second accommodation groove 23b. The radius R2 of the V-phase bus bar 32 is smaller than the radius R1 of the U-phase bus bar 31. The opposite circumferential ends of the V-phase bus bar 32 face each other in the circumferential direction. The V-phase bus bar 32 thus substantially forms a circular shape. A V-phase power feeding portion 32a, which is curved with respect to the V-phase bus bar 32 to extend in the axial direction, is formed integrally with the V-phase bus bar 32 at one of the circumferential ends of the V-phase bus bar 32. The axial length of the V-phase power feeding portion 32a is equal to the axial length of the U-phase power feeding portion 31a. With reference to FIGS. 10 and 11, the V-phase bus bar 32 is mounted in the second accommodation groove 23b from the side corresponding to the opposing surface 21, with the V-phase power feeding portion 32a received in the second insertion hole 27b from the side corresponding to the opposing surface 21. When mounted in the second accommodation groove 23b, the V-phase bus bar 32 is clamped by the second positioning projection 24b, which is arranged radially outward to the second accommodation groove 23b, and the second holding projections 24f, which are formed in the third positioning projection 24c located radially inward to the second accommodation groove 23b. As a result, the V-phase bus bar 32 is radially positioned relative to the holder 13 by the second positioning projection 24b and the second holding projections 24f. Radial movement of the V-phase bus bar 32 relative to the holder 13 is restricted by the second positioning projection 24b and the second holding projections 24f. In this state, the V-phase bus bar 32 is held by the holder 13. As illustrated in FIG. 2, the V-phase bus bar 32 mounted in the second accommodation groove 23b is exposed to the side corresponding to the non-opposing surface 22 through the eight second connecting portions 26b.

With reference to FIG. 10, the W-phase bus bar 33 is formed by curving one conductive wire 30 in an arcuate shape. The radius of curvature of the W-phase bus bar 33 having the arcuate shape is equal to the radius of curvature of the third accommodation groove 23c. The radius R3 of the W-phase bus bar 33 is smaller than the radius R2 of the V-phase bus bar 32. With reference to FIG. 3A, the radius R3 of the W-phase bus bar 33 is greater than the distance between the inner radial end of each coil U1 to U4, V1 to V4, and W1 to W4 and the axis L5 of the stator core 11. As illustrated in FIG. 10, the opposite circumferential ends of the W-phase bus bar 33 face each other in the circumferential direction. The W-phase bus bar 33 thus substantially forms a circular shape. A W-phase power feeding portion 33a, which is curved with respect to the W-phase bus bar 33 to extend in the axial direction, is formed integrally with the W-phase bus bar 33 at one of the circumferential ends of the W-phase bus bar 33. The axial length of the W-phase power feeding portion 33a is equal to the axial length of the U-phase power feeding portion 31a. With reference to FIGS. 10 and 11, the W-phase bus bar 33 is mounted in the third accommodation groove 23c from the side corresponding to the opposing surface 21, with the W-phase power feeding portion 33a received in the third insertion hole 27c from the side corresponding to the opposing surface 21. When mounted in the third accommodation groove 23c, the W-phase bus bar 33 is clamped by the third positioning projection 24c, which is arranged radially outward to the third accommodation groove 23c, and the third holding projections 24g, which are formed in the fourth positioning projection 24d located radially inward to the third accommodation groove 23c. As a result, the W-phase bus bar 33 is radially positioned relative to the holder 13 by the third positioning projection 24c and the third holding projections 24g. Radial movement of the W-phase bus bar 33 relative to the holder 13 is restricted by the third positioning projection 24c and the third holding projections 24g. In this state, the W-phase bus bar 33 is held by the holder 13. As illustrated in FIG. 2, the W-phase bus bar 33 mounted in the third accommodation groove 23c is exposed to the side corresponding to the non-opposing surface 22 through the four third connecting portions 26c.

As illustrated in FIGS. 2 and 10, the U-phase bus bar 31, the V-phase bus bar 32, and the W-phase bus bar 33 are arranged coaxially about the axis L5 of the stator core 11 in the stator 2. As has been described, the bus bars 31 to 33 are each accommodated in the corresponding one of the first accommodation groove 23a, the second accommodation groove 23b, and the third accommodation groove 23c. In this manner, the bus bars 31 to 33 are held by the holder 13 in a radially layered state without being overlapped as viewed in the axial direction. The holder 13 maintains the U-phase bus bar 31, the V-phase bus bar 32, and the W-phase bus bar 33 such that the bus bars 31 to 33 are radially spaced apart and the radial interval between each adjacent pair of the bus bars 31 to 33 is maintained constant. The bus bars 31 to 33 are layered in a radial direction of each coil U1 to U4, V1 to V4, and W1 to W4 (corresponding to a radial direction of the stator core 11) in the range corresponding to the radial width of the coil U1 to U4, V1 to V4, and W1 to W4. The bus bars 31 to 33 are arranged to be radially layered at the side of the holder 13 corresponding to the opposing surface 21 and thus overlapped with the twenty-four connection wires 20, which are arranged at the side corresponding to the non-opposing surface 22, as viewed in the axial direction. In other words, as viewed axially, the bus bars 31 to 33 intersect the connection wires 20. With reference to FIGS. 1B and 2, the connection wires 20 are arranged at the axial end of the holder 13 at the side corresponding to the non-opposing surface 22. The three bus bars 31 to 33 are arranged at the axial end of the holder 13 at the side corresponding to the opposing surface 21. The opposing surface of the holder 13 axially faces the corresponding axial ends of the coils U1 to U4, V1 to V4, and W1 to W4. As a result, the bus bars 31 to 33 axially face the coils U1 to U4, V1 to V4, W1 to W4, which are circumferentially arranged, and are arranged axially close to the coils U1 to U4, V1 to V4, and W1 to W4, compared to the distal portions of the connection wires 20 (which are accommodated in the corresponding guide grooves 25).

Figure 17:
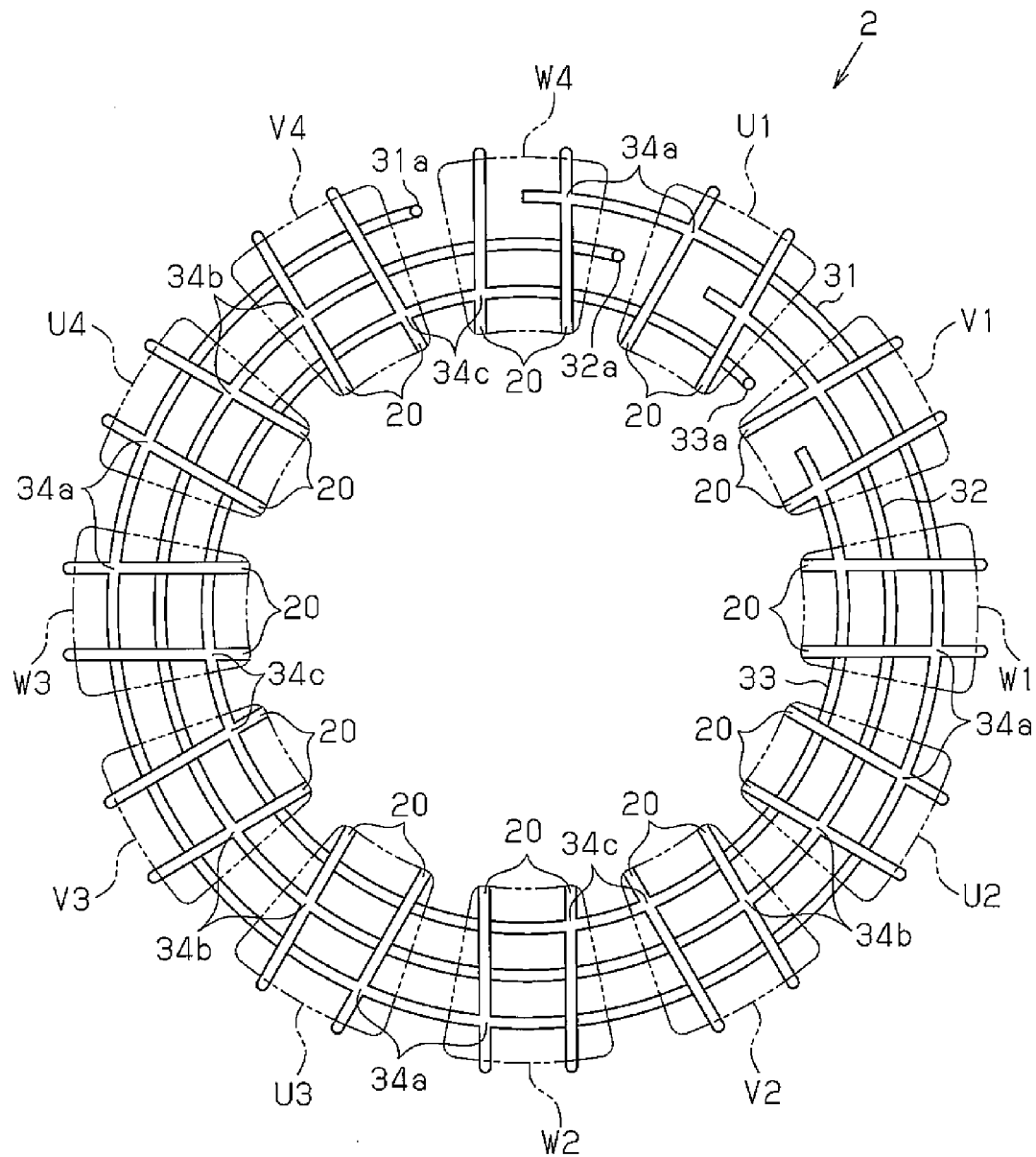
FIG. 17 is a schematic view showing the stator illustrated in FIG. 2.

As illustrated in FIGS. 2 and 17, the first connection wires 20 of the coils U1, W1, U2, W2, U3, W3, U4, and W4, which are a total of eight connection wires 20, intersect the U-phase bus bar 31 in the corresponding first connecting portions 26a. Specifically, in the eight first connecting portions 26a, the aforementioned eight connection wires 20 intersect the U-phase bus bar 31 to form eight first connection intersecting portions 34a. In other words, the first connecting portions 26a, each of which extends axially through the holder 13, are formed at the eight positions of the holder 13 corresponding to the eight first connection intersecting portions 34a. With reference to FIG. 11, the U-phase bus bar 31 intersects the eight connection wires 20 in the corresponding first connecting portions 26a such that each of the first connection intersecting portions 34a is contained in the range corresponding to the axial thickness of the holder 13. Referring to FIGS. 2 and 17, the first connection intersecting portions 34a are subjected to welding in the corresponding first connecting portions 26a to electrically connect the eight connection wires 20 to the U-phase bus bar 31.

The second connection wire 20 of the coil U1, the first connection wire 20 of the coil V1, the second connection wire 20 of the coil U2, the first connection wire 20 of the coil V2, the second connection wire 20 of the coil U3, the first connection wire 20 of the coil V3, the second connection wire 20 of the coil U4, and the first connection wire 20 of the coil V4, which are a total of eight connection wires 20, intersect the V-phase bus bar 32 in the corresponding second connecting portions 26b. Specifically, in the eight second connecting portions 26b, the aforementioned eight connection wires 20 intersect the V-phase bus bar 32 to form eight second connection intersecting portions 34b. In other words, the second connecting portions 26b, each of which extends axially through the holder 13, are formed at the eight positions of the holder 13 corresponding to the eight second connection intersecting portions 34b. The V-phase bus bar 32 intersects the eight connection wires 20 in the corresponding second connecting portions 26b such that each of the second connection intersecting portions 34b is contained in the range corresponding to the axial thickness of the holder 13. The second connection intersecting portions 34b are subjected to welding in the corresponding second connecting portions 26b to electrically connect the eight connection wires 20 to the V-phase bus bar 32.

The second connection wires 20 of the coils V1, W1, V2, W2, V3, W3, V4, and W4, which are a total of eight connection wires 20, intersect the W-phase bus bar 33 in the corresponding third connecting portions 26c. Specifically, in the eight third connecting portions 26c, the aforementioned eight connection wires 20 intersect the W-phase bus bar 33 to form eight third connection intersecting portions 34c. In other words, the third connecting portions 26c, each of which extends axially through the holder 13, are formed at the eight positions of the holder 13 corresponding to the eight third connection intersecting portions 34c. The W-phase bus bar 33 intersects the eight connection wires 20 in the corresponding third connecting portions 26c such that each of the third connection intersecting portions 34c is contained in the range corresponding to the axial thickness of the holder 13. The third connection intersecting portions 34c are subjected to welding in the corresponding third connecting portions 26c to electrically connect the eight connection wires 20 to the W-phase bus bar 33.

Figure 16:
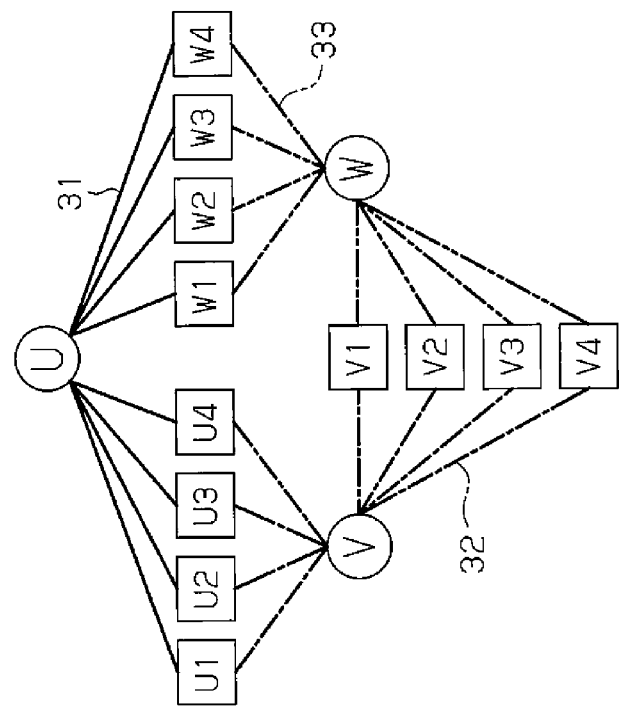
FIG. 16 is a diagram representing the connecting state of the coils through the bus bars.

The connection wires 20 overlap with the three bus bars 31 to 33 as viewed in the axial direction to form the three types of intersecting portions. However, to connect the connection wires 20 of desired ones of the coils U1 to U4, V1 to V4, and W1 to W4, the connection wires 20 are electrically connected to the corresponding bus bars 31 to 33 only in the corresponding ones of the first connection intersecting portions 34a, the second connection intersecting portions 34b, and the third connection intersecting portions 34c. The twenty-four connection wires 20 are circumferentially arranged in the repeated order from each circumferentially adjacent pair of the connection wires 20 connected to the U-phase bus bar 31 to each circumferentially adjacent pair of the connection wires 20 connected to the V-phase bus bar 32, and then to the corresponding adjacent pair of the connection wires 20 connected to the W-phase bus bar 33. When the connection wires 20 are connected to the corresponding bus bars 31 to 33 as has been described, the U-phase coils U1 to U4 are connected in parallel through the U-phase bus bar 31 and the V-phase bus bar 32, as illustrated in FIG. 16. Also, the V-phase coils V1 to V4 are connected in parallel through the V-phase bus bar 32 and the W-phase bus bar 33 and the W-phase coils W1 to W4 are connected in parallel through the W-phase bus bar 33 and the U-phase bus bar 31. The twelve coils U1 to U4, V1 to V4, and W1 to W4 are electrically connected together through the bus bars 31 to 33 and delta-connected through the bus bars 31 to 33. In FIG. 16, the U-phase bus bar 31 is represented by the solid lines, the V-phase bus bar 32 is represented by the single-dotted chain lines, and the W-phase bus bar 33 is represented by the double-dotted chain lines.

As illustrated in FIGS. 1A and 1B, the non-opposing surface 22 of the holder 13 is covered by the cover 41, which has a circular shape. The cover 41 is formed of insulating plastic and the inner diameter and the outer diameter of the cover 41 are equal to the inner diameter and the outer diameter of the holder 13, respectively. Twelve engagement claws 41a, each extending axially toward the corresponding split core piece 12, are formed at corresponding circumferential positions in an outer peripheral portion of the cover 41 that are circumferentially spaced apart at equal angular intervals (in the illustrated embodiment, by 30°). The engagement claws 41a are received in the corresponding fixing recesses 17h, which are formed in the insulators 15. The distal portions of the engagement claws 41a are axially engaged with the outer peripheral portion of the holder 13. This fixes the cover 41 to the holder 13.

With reference to FIGS. 1A, 1B, and 2, a cylindrical first power feeding support portion 42a is formed in the cover 41 at the position axially facing the first insertion hole 27a. The first power feeding support portion 42a receives the U-phase power feeding portion 31a, which is passed through the first insertion hole 27a. Likewise, a cylindrical second power feeding support portion 42b is formed in the cover 41 at the position axially facing the second insertion hole 27b. The second power feeding support portion 42b receives the V-phase power feeding portion 32a, which extends through the second insertion hole 27b. Also, a cylindrical third power feeding support portion 42c is formed in the cover 41 at the position axially facing the third insertion hole 27c. The third power feeding support portion 42c receives the W-phase power feeding portion 33a, which is inserted through the third insertion hole 27c. The U-phase power feeding portion 31a, the V-phase power feeding portion 32a, and the W-phase power feeding portion 33a are maintained each in a state extending in the axial direction of the stator 2 by means of the first power feeding support portion 42a, the second power feeding support portion 42b, and the third power feeding support portion 42c, respectively, in each of which the corresponding one of the power feeding portions 31a to 33a is received.

The U-phase power feeding portion 31a is electrically connected to a power feeding terminal (not shown) for supplying a U-phase AC electric current. The V-phase power feeding portion 32a is electrically connected to a power feeding terminal (not shown) for providing a V-phase AC electric current. The W-phase power feeding portion 33a is electrically connected to a power feeding terminal (not shown) for sending a W-phase AC electric current. The phases of the U-phase, V-phase, and W-phase AC electric currents are offset by 120°. When an electric current is supplied to the coils U1 to U4, V1 to V4, and W1 to W5 through the corresponding bus bars 31 to 33 in the brushless motor 1, the rotor 3 is rotated in correspondence with a rotating magnetic field produced by the stator 2.

A method for manufacturing the stator 2 of the illustrated embodiment will hereafter be described.

First, a step for winding the coils U1 to U4, V1 to V4, and W1 to W4 around the teeth 12b of the corresponding split core pieces 12 is carried out. In the winding step of the illustrated embodiment, the split core pieces 12, in which the coils U1 to U4, V1 to V4, and W1 to W4 are to be mounted, are maintained separate from one another without being connected to the holder 13. After the insulators 15, 16 are mounted in each of the split core pieces 12 from the opposite axial sides, the coated conductive wire 19 is wound around the tooth 12b of each split core piece 12, covering the insulators 15, 16, for a plurality of times. A corresponding one of the coils U1 to U4, V1 to V4, and W1 to W4 is wound around each one of the teeth 12b of the split core pieces 12. The two connection wires 20, which are the starting end and the finishing end of the coil wound around each tooth 12b, are extended out to the first axial side of the split core piece 12. The basal portions of the connection wires 20 are received in the corresponding holding recesses 17f, which are provided in the associated insulator 15. The basal portions of the connection wires 20 are held by the holding recesses 17f such that the distal portion of each connection wire 20 is maintained in a state extending in the axial direction of the split core piece 12 (the laminating direction of the core sheets 14). In each connection wire 20, the insulating coating membrane 19b is removed to expose the metal wire 19a.

Figure 18:
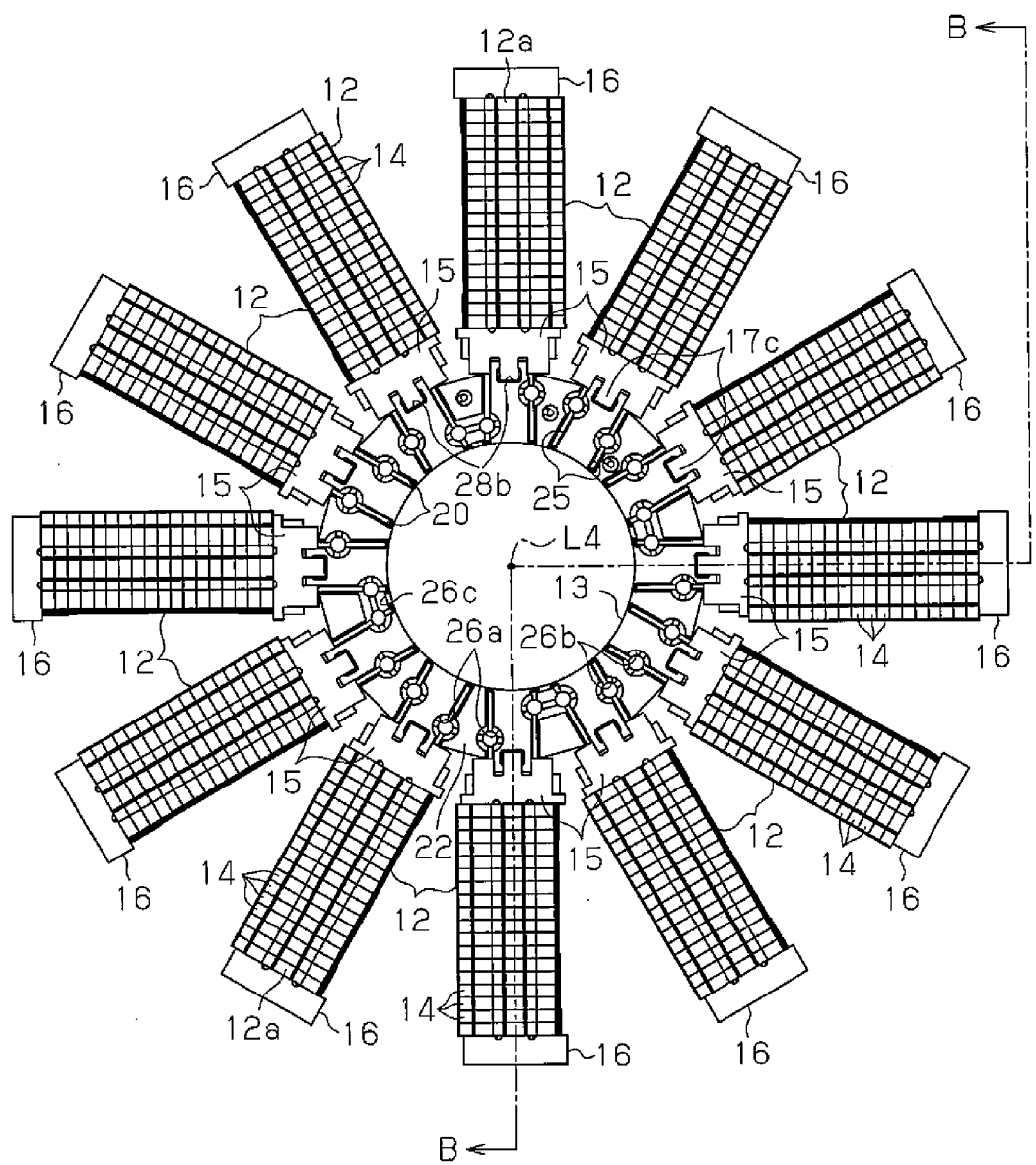
FIG. 18 is a plan view illustrating a method for manufacturing the stator illustrated in FIG. 17.

Subsequently, a step for joining the split core pieces 12 to the holder 13 is performed. In the joining step, the first axial end of each of the twelve split core pieces 12, in which the coils U1 to U4, V1 to V4, and W1 to W4 have been mounted in the winding step, is joined to the holder 13 through the associated one of the insulators 15. The U-phase bus bar 31, the V-phase bus bar 32, and the W-phase bus bar 33, which have been formed in advance, are arranged in advance in the corresponding first to third accommodation grooves 23a to 23c of the holder 13 in a radially layered manner. In other words, the U-phase bus bar 31, the V-phase bus bar 32, and the W-phase bus bar 33 are arranged in advance at the end of the holder 13 corresponding to the opposing surface 21 in a radially layered manner As illustrated in FIG. 18, the split core pieces 12 are arranged around the outer periphery of the holder 13 such that the axial direction of each split core piece 12 corresponds to a radial direction of the holder 13 and that the axial end of the split core piece 12 to which the associated connection wires 20 are extended out is faced radially inward. At this stage, the split core pieces 12 are arranged such that the distal ends of the teeth 12b face the first axial side of the holder 13 (the opposite side to the non-opposing surface 22). In this state, the projecting direction of the joint support portion 17c of each insulator 15 corresponds to a radial direction of the holder 13 and the joint support portions 17c face the corresponding insertion recesses 28b in the axial direction of the holder 13 at the side corresponding to the non-opposing surface 22.

Then, with reference to FIG. 13, the split core pieces 12 are moved from the side corresponding to the non-opposing surface 22 to the side corresponding to the opposing surface 21 (as indicated by arrow α in FIG. 13) in the axial direction of the holder 13. In this manner, the joint projections 17d are received in the corresponding engagement recesses 28c and the joint support portions 17c are inserted in the corresponding insertion recesses 28b. As a result, as illustrated in FIGS. 18 and 14, the first axial end of each split core piece 12 is pivotably joined to the holder 13 through the associated insulator 15. In this state, each split core piece 12 can be pivoted about the joint portion 28 and the joint projections 17d, which are the joining portions between the holder 13 and the split core piece 12, such that the second axial end of the split core piece 12 (the axial end of the split core piece 12 to which the insulator 16 is attached) moves in a radial direction of the holder 13. By joining the split core pieces 12 to the holder 13, the split core pieces 12 are connected together in an annular shape by means of the holder 13.

In the joining step, when each split core piece 12 is joined to the holder 13, the connection wires 20 of the coil U1 to U4, V1 to V4, and W1 to W4 mounted in the split core piece 12 are axially inserted into the corresponding two guide grooves 25 provided in the opposite circumferential sides of the joint portion 28 to which the split core piece 12 is joined (an arrangement step). The twenty-four connection wires 20, which are received in the corresponding guide grooves 25, are each guided by the guide groove 25 to extend substantially in a radial direction of the holder 13. The connection wires 20 are thus arranged to be overlapped with, or intersect, the U-phase bus bar 31, the V-phase bus bar 32, and the W-phase bus bar 33, as viewed in the axial direction. This arrangement forms the eight first connection intersecting portions 34a in which the corresponding eight connection wires 20 intersect the U-phase bus bar 31, the eight second connection intersecting portions 34b in which other corresponding eight connection wires 20 intersect the V-phase bus bar 32, and the eight third connection intersecting portions 34c in which the remaining eight connection wires 20 intersect the W-phase bus bar 33.

Referring to FIGS. 18 and 19, when the split core pieces 12 are joined to the holder 13 through the insulators 15, the split core pieces 12 are arranged such that the axial direction of each split core piece 12 corresponds to a radial direction of the holder 13 and the distal ends of the teeth 12b all face the first axial side of the holder 13 (the opposite side to the non-opposing surface 22). In FIGS. 18 and 19, the coils U1 to U4, V1 to V4, and W1 to W4 are omitted except for the portions corresponding to the connection wires 20 in FIG. 18.

Next, a connecting step for electrically connecting the U-phase bus bar 31, the V-phase bus bar 32, and the W-phase bus bar 33 to the corresponding connection wires 20 by welding the first connection intersecting portions 34a, the second connection intersecting portions 34b, and the third connection intersecting portions 34c. The connecting step of the illustrated embodiment is carried out in the state after completion of the joining step, as illustrated in FIGS. 18 and 19, which is the state where the split core pieces 12 are arranged such that the axial direction of each split core piece 12 corresponds to a radial direction of the holder 13. In the joining step, each first connection intersecting portion 34a is subjected to welding in the corresponding first connecting portion 26a in the axial direction of the holder 13. This electrically connects the U-phase bus bar 31 to the corresponding eight connection wires 20. The V-phase bus bar 32 is electrically connected to other corresponding eight connection wires 20 by performing welding on the second connection intersecting portions 34b in the corresponding second connecting portions 26b in the axial direction of the holder 13. Then, to electrically connect the W-phase bus bar 33 to the remaining eight connection wires 20, the third connection intersecting portions 34c are subjected to welding in the corresponding third connecting portions 26c in the axial direction of the holder 13. In the connecting step of the illustrated embodiment, resistance welding is employed to electrically connect the U-phase bus bar 31, the V-phase bus bar 32, and the W-phase bus bar 33 to the corresponding connection wires 20.

Then, an annular arrangement step for arranging the twelve split core pieces 12 in a circular shape by pivoting the split core pieces 12 relative to the holder 13 is performed. In the annular arrangement step, the second axial end of each split core piece 12, which is the axial end that is free, or, in other words, spaced, from the holder 13, is pressed from the side corresponding to the proximal end of the tooth 12b to the side corresponding to the distal end of the tooth 12b (in the direction spaced from the viewer with respect to the drawing surface as viewed in FIG. 18). The split core piece 12 is thus pivoted about the pivot axis L3 relative to the holder 13. This moves the second axial end of the split core piece 12 from the side corresponding to the non-opposing surface 22 toward the side corresponding to the opposing surface 32, as viewed in the axial direction. As viewed radially, the second axial end of the split core piece 12 is moved inward in a radial direction of the holder 13. When the split core pieces 12 are pivoted about the joining portions with respect to the holder 13 (the joint portions 28), the split core pieces 12 are prevented from moving in a circumferential direction of the holder 13. As a result, each split core piece 12 is pivoted relative to the holder 13 such that the distal end of the associated tooth 12b faces inward in a radial direction of the holder 13. At this stage, the engagement projection 12c of each of the yoke portions 12a is engaged with the engagement recess 12d of the corresponding circumferentially adjacent one of the yoke portions 12d from an outer radial side. When the split core pieces 12 are pivoted relative to the holder 13, the connection wires 20 become curved in correspondence with the outer periphery of the holder 13. The connection wires 20 are thus curved each in a shape matching the curved guide portion 25a (see FIG. 12).

As has been described, the split core pieces 12 are pivoted about the pivot axes L3 relative to the holder 13. As a result, the split core pieces 12 are circumferentially located and arranged in a circular shape such that the yoke portions 12a form an annular shape as a whole and that the distal ends of the teeth 12b all face radially inward. The first axial ends of the coils U1 to U4, V1 to V4, and W1 to W4 (the axial ends to which the connection wires 20 are extended out) axially face the opposing surface 21 of the holder 13. The basal portions of the connection wires 20 extend substantially in the axial direction of the holder 20 and the distal portions of the connection wires 20 (the portions received in the guide grooves 25) are each arranged substantially in a radial direction of the holder 13.

After the annular arrangement step, the cover 41 is fixed to the holder 13 to cover the non-opposing surface 22 of the holder 13. As a result, the stator 2 is completed.

As has been described, the illustrated embodiment has the advantages described below.

(1) The twelve split core pieces 12 are joined to the holder 13 at the corresponding twelve circumferential positions through the associated insulators 16. This arranges the first axial ends of the split core pieces 12 in a circumferential direction of the holder 13. The split core pieces 12 are pivoted relative to the holder 13 such that the second axial end of each split core piece 12 moves in a radial direction of the holder 13. The split core pieces 12 are thus arranged in an annular shape. In other words, annular arrangement of the split core pieces of the illustrated embodiment is different from the conventional case where each adjacent pair of split core pieces are pivoted relative to each another by engaging the corresponding circumferential ends of the yoke portions of the split core pieces with each other and sliding the yoke portions on each other. Accordingly, the split core pieces 12 are arranged in an annular shape without being influenced by friction produced between each adjacent pair of the split core pieces 12. The split core pieces 12 are joined together in an annular shape by means of the holder 13 by joining the first axial ends of the split core pieces 12 to the holder 13. Specifically, when joined to the holder 13, the split core pieces 12 are arranged near the positions at which the respective split core pieces 12 are to be located when arranged in an annular shape even before such annular arrangement. This facilitates annular arrangement of the split core pieces 12, which is performed after joint between the split core pieces 12 and the holder 13. As a result, the split core pieces 12 are easily arranged in the annular shape.

(2) The holder 13 has the twelve joint portions 28 located at the corresponding twelve circumferential positions. The first axial end of each one of the split core pieces 12 is joined to the corresponding one of the joint portions 28 through the associated insulator 15. The split core pieces 12 are detachably and pivotably joined to the corresponding joint portions 28 through relative movement between the holder 13 and the split core pieces 12 in the axial direction of the holder 13. The first axial ends of the split core pieces 12 are thus easily joined to the holder 13 by causing relative movement between the split core pieces 12, to which the insulators 15 are attached, and the holder 13 in the axial direction of the holder 13. Also, removal of the first axial ends of the split core pieces 12 from the holder 13 is easily accomplished through relative movement between the split core pieces 12 having the insulators 15 and the holder 13 in the axial direction of the holder 13.

(3) By guiding the connection wires 20 using the guide grooves 25, the connection wires 20 are easily arranged in a manner overlapped with, or, in other words, intersecting, the bus bars 31 to 33, as viewed in the axial direction. Also through guiding of the connection wire 20 using the guide grooves 25, the connection wires 20 are positioned with respect to not only the bus bars 31 to 33 but also the holder 13. The connection wires 20 are thus prevented from moving relative to the holder 13. Since the bus bars 31 to 33 are held by the holder 13, the bus bars 31 to 33 are prevented from moving relative to the holder 13. As a result, the bus bars 31 to 33 and the corresponding connection wires 20, which are connected together, are positioned by the holder 13. Accordingly, in the first to third connection intersecting portions 34a to 34c, which are formed by intersecting the bus bars 31 to 33 and the corresponding connection wires 20 that are to be electrically connected together, the bus bars 31 to 33 are easily connected electrically to the connection wires 20. Since the bus bars 31 to 33 and the connection wires 20 are positioned by the holder 13, reactive force is prevented from being produced at the connecting portions between the bus bars 31 to 33 and the connection wires 20 in response to vibration of the stator 2 when the brushless motor 1 is in operation. This improves connection reliability between the bus bars 31 to 33 and the connection wires 20. Also, noise is prevented from being caused by vibration of the bus bars 31 to 33.

(4) The bus bars 31 to 33 are all arranged at the first axial end of the holder 13 (the side corresponding to the opposing surface 21). The connection wires 20 are all located at the second axial end of the holder 13 (the side corresponding to the non-opposing surface 22). This arrangement easily ensures insulation between each bus bar 31 to 33 and those of the connection wires 20 that are not connected to the bus bar 31 to 33. In the illustrated embodiment, the first to third connection intersecting portions 34a to 34c are each formed in the range corresponding to the axial thickness of the holder 13 to connect the corresponding connection wires 20 to the bus bars 31 to 33. This arrangement causes the holder 13 to prevent contact between the components of the brushless motor 1, which is arranged in the vicinity of the holder 13, and the first to third connection intersecting portions 34a to 34c. The connecting portions between the bus bars 31 to 33 and the corresponding connection wires 20 are thus protected by the holder 13. This further enhances the reliability in connection between the bus bars 31 to 33 and the connection wires 20.

For example, if the bus bars 31 to 33 and the connection wires 20 are both arranged at the first axial side of the holder 13, the guide grooves 25 are formed in the first axial side of the holder 13 to receive the corresponding connection wires 20 in the guide grooves 25. The first to third accommodation grooves 23a to 23c, which are sized greater than each guide groove 25 in the axial direction of the holder 13 and circumferentially cross the corresponding guide grooves 25, are formed in the first axial side of the holder 13. The bus bars 31 to 33 are received in the corresponding first to third accommodation grooves 23a to 23c. In this case, the increased axial dimension of each of the first to third accommodation grooves 23a to 23c ensures insulation between each bus bar 31 to 33 and those of the connection wires 20 that are not electrically connected to the bus bar 31 to 33 but increases the axial thickness of the holder 13. In contrast, when the bus bars 31 to 33 are all arranged at the first axial end of the holder 13 and the connection wires 20 are all located at the second axial end of the holder 13 as in the illustrated embodiment, the holder 13 is arranged between each bus bar 31 to 33 and the connection wires 20 that are not electrically connected to the bus bar 31 to 33. Accordingly, even when the axial thickness of the holder 13, which is located between the bus bars 31 to 33 and the connection wires 20, is comparatively small, each bus bar 31 to 33 is insulated from those of the connection wires 20 that are not electrically connected to the bus bar 31 to 33. As a result, the holder 13 is prevented from being enlarged in the axial direction, thus preventing axial enlargement of the stator 2.

(5) The three bus bars 31 to 33 are arranged at the axial side of the holder 13 corresponding to the coils U1 to U4, V1 to V4, and W1 to W4 and the twenty-four connection wires 20 are located at the axial side of the holder 13 opposite to the coils U1 to U4, V1 to V4, and W1 to W4 (the opposite side to the bus bars 31 to 33). In other words, the bus bars 31 to 33 are arranged at the side of the holder 13 corresponding to the opposing surface 21 and the connection wires 20 are located at the side of the holder 13 corresponding to the non-opposing surface 22. In the stator 2, to arrange the connection wires 20, which are axially extended out, to be overlapped with, or intersect, the bus bars 31 to 33 as viewed in the axial direction, each connection wire 20 must be curved at a position between the basal end and the distal portion of the connection wire 20, which extends substantially in a radial direction of the holder 13. In the illustrated embodiment, in which the bus bars 31 to 33 are arranged at the side of the holder 13 corresponding to the coils U1 to U4, V1 to V4, and W1 to W4 and the connection wires 20 are located at the side of the holder 13 opposite to the coils U1 to U4, V1 to V4, and W1 to W4, the curved portion of each connection wire 20 is located at a position spaced from the basal portion of the connection wire 20 compared to the case in which the connection wires 20 are arranged at the side of the holder 13 corresponding to the coils U1 to U4, V1 to V4, and W1 to W4 and the bus bars 31 to 33 are located at the side of the holder 13 opposite to the coils U1 to U4, V1 to V4, and W1 to W4. Each connection wire 20 is thus prevented from being deformed and curved to a great extent. The connection wire 20 is thus moderately curved to be overlapped with, or intersect, the bus bars 31 to 33 as viewed in the axial direction. Specifically, the curved portion of each connection wire 20 is shaped in a manner matching each curved guide portion 25a when the split core piece 12 is pivoted. As a result, the connection wires 20 are curved moderately and smoothly.

(6) The holder 13 is arranged in the range corresponding to the outer diameter of the circular shape in which the twelve split core pieces 12 are arranged. This prevents the stator 2 from being radially enlarged by the holder 13.

(7) In the joining step, the first axial ends of the twelve split core pieces 12 are joined to the holder 13 through the associated insulators 15 at the corresponding circumferential positions and thus arranged in a circumferential direction of the holder 13. In the annular arrangement step, the split core pieces 12 are pivoted relative to the holder 13 such that the second axial ends of the split core pieces 12 each move in a radial direction of the holder 13. The split core pieces 12 are thus arranged in a circular shape. In other words, annular arrangement of the split core pieces 12 is accomplished in a manner different from the conventional case, in which each adjacent pair of split core pieces are pivoted relative to each other by engaging the corresponding circumferential ends of the yoke portions of the split core pieces with each other and sliding the split core pieces on each other. As a result, when the split core pieces 12 are arranged in an annular shape, the split core pieces 12 are prevented from being influenced by friction produced between each adjacent pair of the split core pieces 12. In the joining step, by joining the first axial ends of the split core pieces 12 to the holder 13 through the associated insulators 15, the split core pieces 12 are joined together in an annular shape by means of the holder 13. In other words, when joined to the holder 13, the split core pieces 12 are arranged near the positions at which the respective split core pieces 12 are to be located when the split core pieces 12 are arranged in an annular shape even before such annular arrangement is performed. Accordingly, by carrying out the annular arrangement step after the joining step in which the split core pieces 12 are joined to the holder 13, the split core pieces 12 are easily arranged in an annular shape in the annular arrangement step. As a result, the annular arrangement of the split core pieces 12 is facilitated and the stator 2 is easily manufactured.

(8) In the joining step, the first axial ends of the twelve split core pieces 12 are pivotably joined to the holder 13 through the associated insulators 15. Further, the twenty-four connection wires 20 are guided by the corresponding guide grooves 25, which are formed in the holder 13, to be arranged such that the connection wires 20 are overlapped with, or intersect, the bus bars 31 to 33 as viewed in the axial direction (the arrangement step). Accordingly, after the joining step (including the arrangement step) is completed, the coils U1 to U4, V1 to V4, and W1 to W4 are wound around the teeth 12b of the corresponding split core pieces 12 and the split core pieces 12 are joined to the holder 13 in which the bus bars 31 to 33 are mounted. That is, after the joining step, the first axial end of each split core piece 12, in which the associated coil U1 to U4, V1 to V4, and W1 to W4 is wound around the tooth 12b, is joined to the holder 13 through the associated insulator 15 even before the annular arrangement step is performed. Accordingly, after having been arranged with respect to the bus bars 31 to 33 in the joining step, the connection wires 20 are prevented from displacing circumferentially or radially with respect to the bus bars 31 to 33. As a result, in the connecting step that follows the joining step, electrical connection between each bus bar 31 to 33 and the corresponding connection wires 20 in the corresponding first to third connection intersecting portions 34a to 34c is further facilitated.

(9) In the connecting step, each bus bar 31 to 33 is electrically connected to the corresponding connection wires 20 with the split core pieces 12 arranged such that the axial direction of each split core piece 12 corresponds to a radial direction of the holder 13. Accordingly, when each bus bar 31 to 33 is electrically connected to the corresponding connection wires 20 in the connecting step, the split core pieces 12 and the coils U1 to U4, V1 to V4, and W1 to W4 are located at positions offset from the bus bars 31 to 33 in radial directions of the holder 13. That is, the split core pieces 12 or any one of the coils U1 to U4, V1 to V4, and W1 to W4 are not arranged at either one of the opposite axial sides of each bus bar 31 to 33. This allows a device or jig for connecting each bus bar 31 to 33 to the corresponding connection wires 20 to easily approach the first to third connection intersecting portions 34a to 34c in the axial direction of the bus bar 31 to 33. This further facilitates connection between each bus bar 31 to 33 and the corresponding connection wires 20 in the corresponding first to third connection intersecting portions 34a to 34c. Further, the portion of each bus bar 31 to 33 and the portion of each connection wire 20 in the vicinity of the corresponding first to third connection intersecting portion 34a to 34c are axially maintained using a jig. This allows electrical connection between each bus bar 31 to 33 and the corresponding connection wires 20 in the corresponding first to third connection intersecting portions 34a to 34c with the position of the bus bar 31 to 33 maintained in a stable relationship with the positions of the connection wires 20. As a result, each bus bar 31 to 33 is stably connected to the corresponding connection wires 20.

(10) In the winding step, the coils U1 to U4, V1 to V4, and W1 to W4 are wound around the teeth 12b of the corresponding split core pieces 12, which are separate from one another without being joined to the holder 13. Accordingly, when the coated conductive wire 19 is wound around the tooth 12b of the corresponding split core piece 12 to form the coil U1, for example, the coated conductive wire 19 does not interfere with another one of the split core pieces 12 or another one of the coils U2 to U4, V1 to V4, and W1 to W4. The coil U1 is thus easily wound around the tooth 12b. In similar manners, the coils U2 to U4, V1 to V4, and W1 to W4 are also easily wound around the teeth 12b of the corresponding split core pieces 12. This increases the space factor of each coil compared to the conventional case in which mounting of the coils is performed in a state in which each circumferentially adjacent pair of the split core pieces are joined together.

(11) The bus bars 31 to 33 are formed in advance before being arranged with respect to the holder 13. The bus bars 31 to 33 are thus formed as separate bodies. This improves accuracy for forming the bus bars 31 to 33. As a result, an error in the axial dimension of each bus bar 31 to 33 is limited to a small value, thus making it possible to decrease the axial interval between each coil U1 to U4, V1 to V4, and W1 to W4 and each bus bar 31 to 33 in the stator 2. A small axial interval between each coil U1 to U4, V1 to V4, and W1 to W4 and each bus bar 31 to 33 decreases the axial dimension of the stator 2.

(12) Since the bus bars described in Japanese Patent No. 3430839 are each formed by a linear coated conductive wire, waste of material decreases and the yield increases. However, each of the connection wires extends radially outward from the corresponding one of the bus bars, each of which has an arcuate shape, and projects radially outward from the bus bar holder. As a result, the stator having the bus bars is enlarged disadvantageously in a radial direction.

In contrast, in the illustrated embodiment, the connection wires 20 through which the U-phase bus bar 31, the V-phase bus bar 32, and the W-phase bus bar 33 are connected to the corresponding coils U1 to U4, V1 to V4, and W1 to W4 are arranged to be overlapped with the bus bars 31 to 33 as viewed in the axial direction. Also, the connection wires 20 are electrically connected to the corresponding bus bars 31 to 33 in the corresponding connection intersecting portions 34a to 34c in which the connection wires 20 intersect the bus bars 31 to 33. In other words, each connection wire 20 is connected to the corresponding bus bar 31 to 33 at a position in the range in which the bus bar 31 to 33 is arranged, not at a position radially outward or inward to the bus bars 31 to 33 in a radial direction of the holder 13. This reduces the radial dimension of the stator 2 without excessively decreasing the radius of each bus bar 31 to 33, which is formed by the conductive wire 30. In other words, the outer diameter of the stator 2 and the radial width of the holder 13 are reduced without excessively decreasing the radius of each bus bar 31 to 33. Also, even without highly accurate positioning of the connection wires 20 with respect to the bus bars 31 to 33, the first connection intersecting portions 34a to 34c, in which the connection wires 20 intersect the corresponding bus bars 31 to 33, are easily formed by arranging the connection wires 20 to be overlapped with the bus bars 31 to 33 as viewed in the axial direction. As a result, the connection wires 20 are easily arranged with respect to the bus bars 31 to 33, thus facilitating manufacture of the stator 2.

(13) The first axial end of each split core piece 12 is pivotably joined to the holder 13 through the insulator attached to the split core piece 12. Accordingly, the structure for joining each split core piece 12 to the holder 13 (in the illustrated embodiment, the joint support portion 17c and the joint projections 17d) is formed in the associated insulator 15, not the split core piece 12. This prevents each split core piece 12, which is formed by the core sheets 14, from having a complicated shape.

The illustrated embodiment of the present invention may be modified in accordance with the forms described below.

In the connecting step of the illustrated embodiment, each bus bar 31 to 33 is electrically connected to the corresponding connection wires 20 when the twelve split core pieces 12 are arranged such that the axial direction of each split core piece 20 corresponds to a radial direction of the holder 13. However, the connecting step may be carried out after the annular arrangement step in which the split core pieces 12 are arranged in a circular shape.

As has been described, in the joining step, the first axial ends of the split core pieces 12 are pivotably joined to the holder 13 at the corresponding circumferential positions. In the arrangement step, the connection wires 20 are guided by the corresponding guide grooves 25 to be arranged such that the connection wires 20 are overlapped with, or intersect, the bus bars 31 to 33, as viewed in the axial direction. In the illustrated embodiment, the arrangement step is performed in the joining step. However, the joining step and the arrangement step may be performed independently from each other.

In the illustrated embodiment, the winding step is performed prior to the joining step. However, the winding step may be carried out after the joining step. For example, if the winding step is performed after the joining step, the split core pieces 12 have been arranged such that the axial direction of each split core piece 12 corresponds to a radial direction of the holder 13 by the time the winding step is started. In this state, the coils U1 to U4, V1 to V4, and W1 to W4 are wound around the teeth 12b of the corresponding split core pieces 12. The winding step is followed by the annular arrangement step. In this manner, the winding step forms a space between each of the split core pieces 12, in which a coil (the corresponding one of the coils U1 to U4, V1 to V4, and W1 to W4) is wound around the tooth 12b, and the two circumferentially adjacent ones of the split core pieces 12. As a result, when each of the coils U1 to U4, V1 to V4, and W1 to W4 is mounted in the corresponding one of the split core pieces 12, a device for winding the coil U1 to U4, V1 to V4, and W1 to W4 and the coated conductive wire 19 supplied by the device are prevented from interfering with the two circumferentially adjacent ones of the split core pieces 12. This facilitates winding of the coils U1 to U4, V1 to V4, and W1 to W4. In the joining step, the first axial ends of the split core pieces 12 are joined to the holder 13 at the corresponding circumferential positions through the associated insulators 15 and thus arranged in a circumferential direction of the holder 13. In the annular arrangement step, the split core pieces 12 are arranged in a circular shape by pivoting the split core pieces 12 relative to the holder 13 such that the second axial ends of the split core pieces 12 each move in a radial direction of the holder 13. In other words, the split core pieces 12 are arranged in the annular shape in a manner different from the conventional case, in which each adjacent pair of the split core pieces are pivoted relative to each other by engaging the corresponding circumferential ends of the yoke portions of the split core pieces with each other and sliding the yoke portions on each other. The split core pieces 12 are thus prevented from being influenced by friction generated between each adjacent pair of the split core pieces 12 when the split core pieces 12 are arranged in an annular shape. The split core pieces 12 are joined together in an annular shape by means of the holder 13 by joining the first axial ends of the split core pieces 12 to the holder 13 through the associated insulators 15 in the joining step. Accordingly, even before annular arrangement of the split core pieces 12, the split core pieces 12 are located near the positions at which the split core pieces 12 are to be located when arranged in the annular shape. As a result, the annular arrangement of the split core pieces 12 in the annular arrangement step is facilitated by performing the annular arrangement step after the joining step in which the split core pieces 12 are joined to the holder 13, not only in a case in which the joining step is carried out after the winding step as in the illustrated embodiment but also in a case in which the winding step is performed after the joining step as in this modified example. This facilitates the annular arrangement of the split core pieces 12 in the annular arrangement step, thus facilitating manufacture of the stator 2.

If performed after the joining step, the winding step may be performed in the manner described below. Specifically, in the twelve split core pieces 12 joined to the holder 13, each pair of alternate split core pieces 12 are pivoted about the joining portions (the joint portions 28) between the split core pieces 12 and the holder 13 relative to the holder 13 such that the distal end of each of the associated teeth 12*b* faces outward in a radial direction of the holder 13. In this state, coils (corresponding ones of the coils U1 to U4, V1 to V4, and W1 to W4) are wound around the teeth 12*b* of the split core pieces 12 that are located between the pivoted split core pieces 12. This forms an enlarged space between each pair of the pivoted split core pieces 12 and a corresponding pair of the non-pivoted split core pieces 12 that are adjacent to the pivoted split core pieces 12. Accordingly, when coils are wound around the non-pivoted split core pieces 12, which are circumferentially adjacent to the corresponding pivoted split core pieces 12, a device for winding the coils U1 to U4, V1 to V4, and W1 to W4 and the coated conductive wire 19 sent by the device are prevented from interfering with the split core pieces 12 that are subjected to coil winding (the split core pieces 12 adjacent to the pivoted split core pieces 12). This further facilitates winding of the coils U1 to U4, V1 to V4, and W1 to W4. In the winding step performed for the stator 2 employed in an outer rotor type brushless motor, each pair of alternate split core pieces 12 is pivoted about the joining portions between the split core pieces 12 and the holder 13 relative to the holder 13 such that the distal end of each of the associated teeth 12*b* faces inward in a radial direction of the holder 13.

Alternatively, the winding step may be performed in the manner described below. Specifically, split core pieces 12 are pivoted relative to the holder 13 such that the distal ends of the teeth 12*b* of first pivoted split core pieces 12 face outward in a radial direction of the holder 13, and such that the distal ends of the teeth 12*b* of second pivoted split core pieces 12 face inward in a radial direction of the holder 13. The second pivoted split core pieces 12 include at least a pair of split core pieces 12 adjacent to each of the first pivoted split core pieces 12. In this state, the corresponding coils (corresponding ones of the coils U1 to U4, V1 to V4, and W1 to W4) are wound around the teeth 12*b* of the first pivoted split core pieces 12. This forms an enlarged space between each pair of the pivoted split core pieces 12 and a corresponding pair of the non-pivoted split core pieces 12 that are adjacent to the pivoted split core pieces 12. Since there are no split core pieces 12 are circumferentially adjacent to the first pivoted split core pieces 12, this further facilitates winding of the coils U1 to U4, V1 to V4, and W1 to W4. After the coils are wounded around the teeth 12*b* of the first pivoted split core pieces 12, the first pivoted split core pieces 12 are pivoted relative to the holder 13 such that the distal end of each of the associated teeth 12*b* faces inward in a radial direction of the holder 13. The second pivoted split core pieces 12, around which no coils are wounded, are pivoted relative to the holder 13 such that the distal end of each of the associated teeth 12*b* faces outward in a radial direction of the holder 13. Then, the coils are wounded around the teeth 12*b* of the second pivoted split core pieces 12. The second split core pieces 12 are pivoted relative to the holder 13 such that the distal end of each of the associated teeth 12*b* faces inward in a radial direction of the holder 13. Accordingly, the split core pieces 12 are arranged in an annular shape.

In the joining step, two or more split core pieces 12 may be joined to the holder 13 simultaneously or the split core pieces 12 may be joined to the holder 13 one at a time. Joining of the split core pieces 12 to the holder 13 in the joining step may be accomplished by moving the holder 13 toward the split core pieces 12 in the axial direction of the holder 13, not by moving the split core pieces 12 in the axial direction of the holder 13.

In the annular arrangement step, two or more of the split core pieces 12 may be pivoted relative to the holder 13 simultaneously. Alternatively, the split core pieces 12 may be pivoted relative to the holder 13 one at a time.

In the illustrated embodiment, the holder 13 is arranged in the range corresponding to the outer diameter of each of the split core pieces 12, which are arranged in a circular shape. However, the holder 13 may be arranged in the range corresponding to the radial width of each of the split core pieces 12, which are arranged in a circular shape. This also prevents the holder 13 from increasing the radial dimension of the stator 2. The outline of the holder 13 may be greater than the outer diameter of each of the split core pieces 12, which are located in a circular shape, or smaller than the inner diameter of each split core piece 12.

In the illustrated embodiment, the three bus bars 31 to 33 are arranged at the axial side of the holder 13 corresponding to the coils U1 to U4, V1 to V4, and W1 to W4 (the side corresponding to the opposing surface 21) with respect to the holder 13. The twenty-four connection wires 20 are located at the opposite axial side (corresponding to the non-opposing surface 22) to the side corresponding to the coils U1 to U4, V1 to V4, and W1 to W4 with respect to the holder 13. However, the bus bars 31 to 33 may be mounted at the axial end of the holder 13 corresponding to the non-opposing surface 22 and the connection wires 20 may be arranged at the axial end of the holder 13 corresponding to the opposing side 21. This also ensures the same advantage as the advantage (4) of the illustrated embodiment.

In the illustrated embodiment, the bus bars 31 to 33 are all arranged at the first axial end of the holder 13 (the side corresponding to the opposing surface 21) and the connection wires 20 are all located at the second axial end of the holder 13 (the side corresponding to the non-opposing surface 22). However, the bus bars 31 to 33 and the connection wires 20 may all be mounted at the first axial end of the holder 13. Alternatively, the bus bars 31 to 33 and the connection wires 20 may be located at the axial end of the holder 13 corresponding to the non-opposing surface 22. These forms of arrangement allow the bus bars 31 to 33 and the connection wires 20 to be mounted with respect to the holder 13 from the same side. The bus bars 31 to 33 and the connection wires 20 are thus easily arranged with respect to the holder 13. This facilitates manufacture of the stator 2.

In the illustrated embodiment, the bus bars 31 to 33 and the corresponding connection wires 20 are electrically connected together through resistance welding performed on the first to third connection intersecting portions 34*a* to 34*c*. However, electrical connection between each bus bar 31 to 33 and the corresponding connection wires 20 may be brought about by any other suitable method than the resistance welding. For example, the bus bars 31 to 33 and the corresponding connection wires 20 may be electrically connected together through welding other than resistance welding, such as laser welding or TIG welding, or soldering or swaging.

In the illustrated embodiment, each of the bus bars 31 to 33 is formed by a tinned copper wire, which is a conductive metal wire having a circular cross section. However, each bus bar 31 to 33 may be formed by any other suitable metal wire than the tinned copper wire, such as a silver wire or an aluminum wire. Also, each bus bar 31 to 33 may be formed by a conductive metal wire having a polygonal cross section. Further, each bus bar 31 to 33 may be formed by a coated conductive wire. Alternatively, the bus bars 31 to 33 may be formed by pressing a conductive metal plate in a linear shape.

Although each bus bar 31 to 33 has an arcuate shape in the illustrated embodiment, the shape of the bus bar 31 to 33 is not restricted to this. That is, each bus bar 31 to 33 may have any suitable shape as long as the bus bar 31 to 33 is shaped in a circumferentially curved shape. The "curved shape" refers to not only the arcuate shape but also a round shape formed by angling a conductive wire at a plurality of positions.

In the illustrated embodiment, the holder 13 has the guide grooves 25 for guiding the corresponding connection wires 20 to arrange the connection wires 20 with respect to the bus bars 31 to 33. However, the connection wires 20 may be guided by guide portions each having any other suitable shape than a groove shape when to be arranged with respect to the bus bars 31 to 33. For example, the guide portions may be axial projections located on the opposite circumferential sides of each of the connection wires 20. Further, the holder 13 does not necessarily have to include guide portions such as the guide grooves 25.

The holder 13 does not necessarily have to include the first to third connection intersecting portions 26a to 26c.

In the illustrated embodiment, the bus bars 31 to 33 are held by the holder 13. However, the bus bars 31 to 33 may be arranged at positions spaced from the holder 13 without being held by the holder 13.

In the illustrated embodiment, the coils U1 to U4, V1 to V4, and W1 to W4 are delta-connected by the bus bars 31 to 33 but may be Y-connected by a plurality of bus bars.

In the illustrated embodiment, the stator 2 includes the three bus bars 31 to 33. However, the number of the bus bars mounted in the stator 2 may be changed as needed depending on the connection mode of the coils U1 to U4, V1 to V4, and W1 to W4 or the number of the coils.

In the illustrated embodiment, each of the bus bars 31 to 33 is formed in correspondence with the AC electric current of the corresponding one of the U phase, the V phase, and the W phase, which are offset by 120°. However, each bus bar 31 to 33 may be provided in correspondence with the AC electric current of a single phase or a corresponding one of multiple phases other than the three phases.

In the illustrated embodiment, the first axial ends of the split core pieces 12 are pivotably joined to the holder 13 by axially inserting the joint support portions 17c of the associated insulators 15, which are attached to the split core pieces 12, into the joint portions 28 formed in the holder 13. However, the joint support portions 17c may be formed in the holder 13 and the joint portions 28 may be arranged in the insulators 15. In this case, the first axial ends of the split core pieces 12 are pivotably joined to the holder 13 by inserting the joint support portions 17c of the holder 13 into the joint portions 28 of the associated insulators 15. Alternatively, the first axial end of each split core pieces 12 may be pivotably joined to the holder 13 using a pin extending along the pivot axis L3, for example, instead of the joint portion 28 and the joint support portion 17c.

In the illustrated embodiment, the twelve split core pieces 12, the holder 13, and the associated insulators 15 configure the stator core 11. However, the stator core 11 may be formed by the split core pieces 12 and the holder 13. In this case, the split core pieces 12 may be pivotably joined directly to the holder 13.

The shape of the holder 13 is not restricted to the circular shape. The holder 13 may be formed in any suitable shape as long as the shape is annular (endless).

Regarding the split core pieces 12, the inner radial end at the first axial end of each split core piece 12 (the distal end of the associated tooth 12b) may be pivotably joined to the holder 13. Alternatively, the first axial ends of the split core pieces 12 may be pivotably connected to an inner peripheral portion of the holder 13 at corresponding circumferential positions.

The shape of each split core piece 12 is not restricted to the shape of the illustrated embodiment. Each split core piece 12 may be formed in any suitable shape as long as, by pivoting the split core pieces 12 with respect to the holder 13 to move the second axial ends (the axial ends free from the holder 13) of the split core pieces 12 each in a radial direction of the holder 13, the split core pieces 12 can be arranged in an annular shape such that the yoke portions 12a form an annular shape as a whole and that the distal ends of the teeth 12b all face radially inward or outward. For example, each split core piece may have a shape defined by omitting the engagement projection 12c and the engagement recess 12d from the shape of each split core piece 12 of the illustrated embodiment. Also, each split core piece may be shaped such that, when multiple split core pieces are arranged in an annular shape, associated yoke portions form a polygonal tubular shape as a whole. Alternatively, the number of the split core pieces 12 configuring the stator core 11 is not restricted to twelve but may be any suitable number as long as the number is plural. In this case, the number of the coils must be changed in correspondence with the number of the split core pieces 12.

Although the stator 2 of the illustrated embodiment includes the cover 41, the cover 41 may be omitted.

The brushless motor 1 is an inner rotor type motor in the illustrated embodiment but may be an outer rotor type motor. In this case, the stator core 11 is formed by arranging a plurality of split core pieces, which are pivotably joined to an annular holder, in an annular shape through pivot of the split core pieces with respect to the holder such that the distal end of every tooth 12b faces radially outward. Alternatively, the stator 2 may be used in a motor (such as a stepping motor) of any other suitable type rather than a brushless motor.

What is claimed is:

1. An annular motor core comprising a plurality of split core pieces, each of the split core pieces including a yoke portion extending in a circumferential direction of the motor core and a tooth extending from the yoke portion substantially in a direction perpendicular to the yoke portion, the split core pieces being circumferentially located and arranged in an annular shape such that the yoke portions of the split core pieces form an annular shape as a whole and that the distal ends of the teeth of the split core pieces face inward or outward in a radial direction of the motor core, wherein each of the split core pieces has a first end and a second end in the axial direction of the motor core, the motor core further includes an annular holder, the holder having joint portions at a plurality of positions in a circumferential direction of the holder, the first end of each split core piece being pivotably joined to a corresponding one of the joint portions, and each split core piece is pivotable about the corresponding joint portion relative to the holder such that the second end of the split core piece moves in a radial direction of the holder.

2. The motor core according to claim 1, wherein each of the joint portions is configured such that the first end of the associated one of the split core pieces can be selectively attached to and detached from the joint portion through relative movement between the holder and the split core piece in the axial direction of the holder.

3. The motor core according to claim 1, wherein
each of the split core pieces is formed by laminating a plurality of plate-like core sheets in the thickness direction of each of the core sheets, an insulator is attached to each split core piece to electrically insulate the split core piece from a coil wound around the tooth of the split core piece, and the first end of each split core piece is joined to the holder through the insulator.

4. The stator according to claim 1, wherein the bus bars are arranged at a first axial end of the holder, and the ends of the coils are located at a second axial end of the holder.

5. The stator according to claim 4, wherein the first end of the holder faces the coils.

6. A stator comprising:

the motor core according to claim 1;

a plurality of bus bars each extending in a circumferential direction of the holder, the bus bars being layered in a radial direction of the holder and held by the holder; and a plurality of coils each wound around the tooth of a corresponding one of the split core pieces, wherein the holder has a guide portion for guiding an end of each of the coils such that the ends of the coils intersect the bus bars as viewed in the axial direction, and the end of each coil is electrically connected to the corresponding one of the bus bars in a connection intersecting portion where the end intersects the bus bar.

7. The stator according to claim 6, wherein the holder is arranged in a range corresponding to the radial width of each of the split core pieces arranged in an annular shape.

8. A method for manufacturing the stator according to claim 6, the method comprising:

a winding step for winding the coils around the teeth of the corresponding split core pieces;

a joining step following the winding step, wherein, in the joining step, the first ends of the split core pieces are pivotably joined to the corresponding joint portions of the holder; and an annular arrangement step following the joining step, wherein, in the annular arrangement step, the split core pieces are pivoted about the associated joint portions relative to the holder such that the second end of each of the split core pieces moves in a radial direction of the holder to arrange the split core pieces in an annular shape such that the yoke portions of the split core pieces form an annular shape as a whole and that the distal end of the tooth of each split core piece faces inward or outward in a radial direction of the holder.

9. The method according to claim 8, comprising:

an arrangement step following the winding step and the joining step, wherein, in the arrangement step, the ends of the coils are guided by a plurality of guide portions formed in the holder to be arranged such that the ends of the coils intersect the bus bars as viewed in the axial direction; and a connecting step for electrically connecting the ends of the coils to the bus bars in the corresponding connection intersecting portions, wherein the annular arrangement step is carried out after the connecting step.

10. The method according to claim 9, wherein, in the connecting, the ends of the coils are electrically connected to the bus bars with the split core pieces arranged such that the axial direction of each split core piece corresponds to a radial direction of the holder.

11. A method for manufacturing the stator according to claim 6, the method comprising:

a joining step for pivotably joining the first ends of the split core pieces to the corresponding joint portions of the holder;

a winding step following the joining step, wherein, in the winding step, the split core pieces are arranged such that the axial direction of each split core piece corresponds to a radial direction of the holder and, in this state, the coils are wound around the teeth of the corresponding split core pieces; and an annular arrangement step following the winding step, wherein, in the annular arrangement step, the split core pieces are pivoted about the corresponding joint portions relative to the holder such that the second end of each of the split core pieces moves in a radial direction of the holder to arrange the split core pieces in an annular shape such that the yoke portions of the split core pieces form an annular shape as a whole and that the distal end of the tooth of each split core piece faces inward or outward in a radial direction of the holder.

12. The method according to claim 11, wherein, in the winding step, each split core piece is pivoted relative to the holder such that the distal ends of the teeth of first pivoted split core pieces face outward in a radial direction of the holder and the distal ends of the teeth of second pivoted split core pieces face inward in a radial direction of the holder, the second pivoted split core pieces including at least a pair of split core pieces adjacent to each of the first pivoted split core pieces, in this state, the corresponding coils are wound around the teeth of the first pivoted split core pieces.

13. The method according to claim 11, wherein, in the winding step, each pair of alternate split core pieces is pivoted relative to the holder such that the distal end of the tooth of each of the pivoted split core pieces faces outward or inward in a radial direction of the holder and, in this state, the corresponding coils are wound around the teeth of those of the split core pieces arranged between the pivoted split core pieces.

14. The method according to claim 11, comprising:

an arrangement step following the winding step and the joining step, wherein, in the arrangement step, the ends of the coils are guided by a plurality of guide portions formed in the holder to be arranged such that the ends of the coils intersect the bus bars as viewed in the axial direction; and a connecting step for electrically connecting the ends of the coils to the bus bars in the corresponding connection intersecting portions, wherein the annular arrangement step is carried out after the connecting step.

15. The method according to claim 14, wherein, in the connecting, the ends of the coils are electrically connected to the bus bars with the split core pieces arranged such that the axial direction of each split core piece corresponds to a radial direction of the holder.

* * * * *